United States Patent
Hwang et al.

(10) Patent No.: US 11,848,012 B2
(45) Date of Patent: Dec. 19, 2023

(54) SYSTEM AND METHOD FOR PROVIDING VOICE ASSISTANT SERVICE

(71) Applicant: SAMSUNG ELECTRONICS CO., LTD., Suwon-si (KR)

(72) Inventors: Inchul Hwang, Suwon-si (KR); Dohee Kang, Suwon-si (KR); Seungyoun Kim, Suwon-si (KR); Dongchul Ma, Suwon-si (KR); Minkyu Park, Suwon-si (KR); Daegeun Yi, Suwon-si (KR); Dohun Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 16/576,020

(22) Filed: Sep. 19, 2019

(65) Prior Publication Data
US 2020/0090652 A1 Mar. 19, 2020

(30) Foreign Application Priority Data

Sep. 19, 2018 (KR) .................. 10-2018-0112378
May 28, 2019 (KR) .................. 10-2019-0062589

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 13/02* (2013.01); *G10L 13/08* (2013.01); *G10L 15/1815* (2013.01); *G10L 15/26* (2013.01)

(58) Field of Classification Search
CPC ......... G10L 13/00; G10L 13/02; G10L 13/08; G10L 15/00; G10L 15/22; G10L 15/26; G10L 15/1815; G06F 3/00; G06F 3/167
See application file for complete search history.

(56) References Cited

U.S. PATENT DOCUMENTS 8,589,157 B2 11/2013 Ju et al.
9,560,469 B2 1/2017 Henderson et al.
(Continued)

FOREIGN PATENT DOCUMENTS

CN 106469212 A 3/2017
CN 107003997 A 8/2017
(Continued)

OTHER PUBLICATIONS

Elibol, Oguz H. and Milad Gholami. "Learning Language Models of Movie Characters." [Available online: Jun. 22, 2017] [Retrieved on Oct. 22, 2021] https://web.archive.org/web/20170622141334/ https://cs224d.stanford.edu/reports/oguz.pdf (Year: 2017).*
(Continued)

*Primary Examiner* — Paras D Shah
*Assistant Examiner* — Sean E Serraguard
(74) *Attorney, Agent, or Firm* — Sughrue Mion, PLLC

(57) ABSTRACT

Provided are an artificial intelligence (AI) system that utilizes a machine learning algorithm such as deep learning, etc., and an application of the AI system. A method performed by a device for providing a voice assistant service through a voice assistant program includes: receiving, from an external device, a character specialized model for the voice assistant program; receiving a user voice input including a request for a response of the voice assistant program and a word indicating a character; determining the character specialized model according to the word indicating the character; generating a response message to the request for the response of the voice assistant program, using the character specialized model; and outputting the generated response message.

18 Claims, 21 Drawing Sheets

(51) Int. Cl.
*G10L 13/02* (2013.01)
*G10L 13/08* (2013.01)
*G10L 15/18* (2013.01)
*G10L 15/26* (2006.01)

(56) References Cited

U.S. PATENT DOCUMENTS

| | | | |
|---|---|---|---|
| 10,692,484 B1* | 6/2020 | Merritt | G10L 25/24 |
| 11,645,547 B2 | 5/2023 | Tian et al. | |
| 2004/0075677 A1* | 4/2004 | Loyall | G10L 13/033 |
| | | | 715/706 |
| 2005/0222846 A1* | 10/2005 | Tomes | H04L 12/66 |
| | | | 704/275 |
| 2008/0183678 A1* | 7/2008 | Weston | G06F 16/335 |
| 2010/0324905 A1 | 12/2010 | Kurzweil et al. | |
| 2014/0019137 A1* | 1/2014 | Kitagishi | G10L 13/04 |
| | | | 704/260 |
| 2014/0278403 A1 | 9/2014 | Jacob et al. | |
| 2015/0186156 A1* | 7/2015 | Brown | G06Q 10/10 |
| | | | 715/706 |
| 2015/0199967 A1 | 7/2015 | Reddy et al. | |
| 2015/0279347 A1* | 10/2015 | Byron | G10L 13/033 |
| | | | 704/260 |
| 2017/0116985 A1* | 4/2017 | Mathias | G06F 40/35 |
| 2017/0250930 A1 | 8/2017 | Ben-Itzhak | |
| 2017/0293610 A1 | 10/2017 | Tran | |
| 2018/0005646 A1 | 1/2018 | Un et al. | |
| 2018/0143802 A1 | 5/2018 | Jang | |
| 2018/0174020 A1 | 6/2018 | Wu | |
| 2018/0204569 A1 | 7/2018 | Nadkar et al. | |
| 2019/0042908 A1* | 2/2019 | Garcia | G06T 13/40 |
| 2019/0147849 A1* | 5/2019 | Talwar | G06N 3/02 |
| | | | 704/258 |
| 2019/0213995 A1* | 7/2019 | Li | G10L 13/0335 |
| 2019/0243594 A1* | 8/2019 | Goslin | G06F 3/167 |
| 2019/0340238 A1* | 11/2019 | Doggett | G06F 40/35 |

FOREIGN PATENT DOCUMENTS

| | | |
|---|---|---|
| CN | 107204189 A | 9/2017 |
| CN | 107657017 A | 2/2018 |
| JP | 2003-210835 A | 7/2003 |
| KR | 10-2005-0100820 A | 10/2005 |
| KR | 10-2009-0086805 A | 8/2009 |
| KR | 10-2016-0108348 A | 9/2016 |
| KR | 10-1662161 B1 | 10/2016 |
| KR | 10-1851356 B1 | 4/2018 |
| KR | 10-1855178 B1 | 5/2018 |
| KR | 10-2018-0073010 A | 7/2018 |
| KR | 10-2018-0075376 A | 7/2018 |

OTHER PUBLICATIONS

André, E., Klesen, M., Gebhard, P., Allen, S., Rist, T. (2000). Integrating Models of Personality and Emotions into Lifelike Characters. In: Paiva, A. (eds) Affective Interactions. IWAI 1999. Lecture Notes in Computer Science, vol. 1814. Springer, Berlin, Heidelberg. https://doi.org/10.1007/10720296_1 (Year: 2000).*

Li, J., Galley, M., Brockett, C., Spithourakis, G.P., Gao, J. and Dolan, B., 2016. A persona-based neural conversation model. arXiv preprint arXiv:1603.06155 [Available online: Mar. 19, 2016] [Retrieved on Jul. 28, 2023] https://arxiv.org/abs/1603.06155v2 (Year: 2016).*

International Search Report (PCT/ISA/210) and Written Opinion (PCT/ISA/237) dated Jan. 30, 2020 issued by the International Searching Authority in International Application PCT/KR2019/011991.

Grishma Jena et al., "Enterprise to Computer: Star Trek chatbot", arxiv.org, Cornell University Library, Ithaca, NY, XP080951096, Aug. 2, 2017, 5 pages.

S. J. du Preez et al., "An intelligent web-based voice chat bot", EUROCON 2009, IEEE, Piscataway, NJ, XP031491878, May 18, 2009, pp. 386-391.

Bingquan Liu et al., "Content-Oriented User Modeling for Personalized Response Ranking in Chatbots", IEEE/ACM Transactions on Audio, Speech, and Language Processing, vol. 26. No. 1, IEEE, XP058385047, Jan. 1, 2018, pp. 122-133.

Communication dated Nov. 27, 2019 issued by the European Patent Office in counterpart European Application No. 19197962.4.

Communication dated Oct. 5, 2021 by the Indian Patent Office in Indian Patent Application No. 201944037623.

Communication dated Dec. 2, 2022 by the European Patent Office for European Patent Application No. 19197962.4.

Communication dated Dec. 1, 2022 by the European Patent Office for European Patent Application No. 19197962.4.

Office Action dated Feb. 28, 2023, issued by Chinese Patent Office for Chinese Application No. 201910886996.3.

Communication dated Sep. 27, 2023 issued by the Korean Intellectual Property Office in counterpart Korean Application No. 10-2019-0114053.

Communication dated Oct. 12, 2023 issued by the Chinese Patent Office in counterpart Chinese Application No. 201910886996.3.

* cited by examiner

FIG. 18

| INPUT VOICE | GENERAL RESPONSE MODE | PORORO RESPONSE MODE |
|---|---|---|
| WHO ARE YOU? | I AM YOUR FRIEND BIXBY | I AM LITTLE PENGUIN PORORO~ |
| SEND MESSAGE TO MOM I AM LATE | SENT MESSAGE TO MOM I AM LATE | WHEN I WILL SEND MESSAGE? LITTLE PENGUIN~ | ized in a predetermined character.

SYSTEM AND METHOD FOR PROVIDING VOICE ASSISTANT SERVICE

CROSS-REFERENCE TO RELATED APPLICATIONS

This application is based on and claims priority under 35 U.S.C. § 119 to Korean Patent Application No. 10-2018-0112378, filed on Sep. 19, 2018, and Korean Patent Application No. 10-2019-0062589, filed on May 28, 2019, in the Korean Intellectual Property Office, the disclosures of which are incorporated herein by reference in their entireties.

BACKGROUND

1. Field

The disclosure relates to a system and a method for providing a voice assistant service, and more particularly, to a system and a method for providing a voice assistant service special

2. Description of Related Art

A voice assistant service is a service providing a response to a user utterance through one or more of automated speech recognition (ASR) processing, natural language understanding (NLU) processing, dialogue manager (DM) processing, natural language generation (NLG) processing, and text to speech (TTS) processing on audio signals.

In the related art, the voice assistant service has to provide a response only in a predetermined style and change the style through a setting menu. In addition, ASR processing, NLU processing, DM processing, NLG processing, and TTS processing of a voice assistant may operate through a rule-based algorithm other than artificial intelligence (AI).

SUMMARY

Provided are a system and a method for providing a voice assistant service specialized in a character.

Also provided are a system and a method for providing a voice assistant service using an artificial intelligence (AI) model specialized in a character.

Also provided are a system and a method for providing a voice assistant service specialized in various characters, using a model of a voice assistant and a character specialized model generated by another device of a $3^{rd}$ party.

Additional aspects will be set forth in part in the description which follows and, in part, will be apparent from the description, or may be learned by practice of the presented embodiments.

According to an embodiment, a method performed by a device of providing a voice assistant service through a voice assistant program includes: receiving, from an external device, a character specialized model for the voice assistant program; receiving a user voice input including a request for a response of the voice assistant program and a word indicating a character; determining the character specialized model according to the word indicating the character; generating a response message to the request for the response of the voice assistant program, using the character specialized model; and outputting the generated response message.

According to another embodiment, a device for providing a voice assistant service includes: a microphone configured to receive a user voice input; a communication interface; a memory storing one or more instructions; and at least one processor configured to execute the one or more instructions to: receive, from an external device through the communication interface, a character specialized model to interoperate with a voice assistant program, receive, through the microphone, the user voice input including a request for a response of the voice assistant program and a word indicating a character corresponding to the character specialized model, generate a response message to the request for the response of the voice assistant program, using the character specialized model interoperating with the voice assistant program, and output the generated response message.

According to another embodiment, a server for providing a voice assistant service includes: a communication interface; a memory storing one or more instructions; and at least one processor configured to execute the one or more instructions to: receive, from an external device through the communication interface, a character specialized model to interoperate with a voice assistant program, receive, through the microphone, the user voice input including a request for a response of the voice assistant program and a word indicating a character corresponding to the character specialized model, generate a response message to the request for the response of the voice assistant program, using the character specialized model interoperating with the voice assistant program, and output the generated response message.

According to another embodiment, a device for providing a voice assistant service includes: a memory storing one or more instructions; and at least one processor configured to execute the one or more instructions to: obtain a user voice input including a request for a response of a voice assistant program and a word indicating a character corresponding to a character specialized model, generate a response message to the request for the response of the voice assistant program, using the character specialized model interoperating with the voice assistant program, and output the generated response message.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 18 is a diagram illustrating an example of a response message according to a response mode, according to an embodiment;

DETAILED DESCRIPTION

Figure 1:
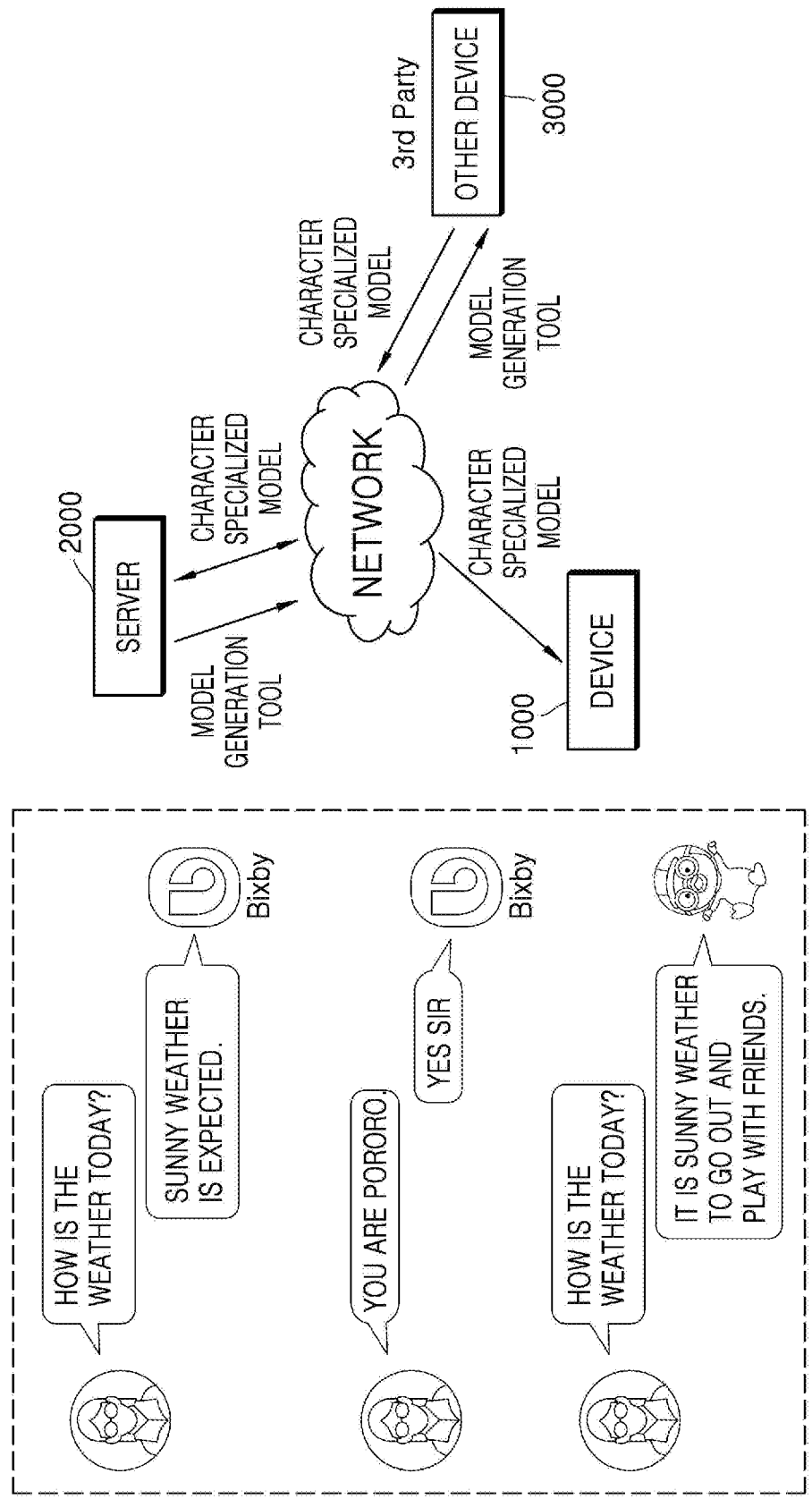
FIG. 1 is a schematic diagram of a system for providing a voice assistant service according to an embodiment.

Embodiments will be described in detail in order to fully convey the scope of the disclosure and enable one of ordinary skill in the art to embody and practice the disclosure. The disclosure may, however, be embodied in many different forms and should not be construed as being limited to embodiments set forth herein. Also, like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements. Throughout the disclosure, expressions such as "at least one of a, b or c" and "at least one of a, b, and c" indicate only a, only b, only c, both a and b, both a and c, both b and c, all of a, b, and c, or variations thereof.

Also, in this specification, a voice assistant service may be a service that provides a chat with a user. The voice assistant service may provide a response message to the user as if a person directly chats with the user in consideration of a situation of the user, a situation of the user, etc. In addition, like a personal assistant of the user, the voice assistant service may appropriately generate information necessary for the user and provide the information to the user.

An artificial intelligence (AI) model may be a model trained using at least one of machine learning, a neural network, genes, deep learning, or a classification algorithm as an AI algorithm.

The model of the voice assistant service may be an AI model trained on criteria and methods for providing the response message to the user in the voice assistant service. The model of the voice assistant service may include, for example, a model for recognizing a user's input speech, a model for interpreting the user's input speech, a model for generating a response message to be provided to the user, and a model for determining an output characteristic of the response message, but is not limited thereto. Models constituting the model of the voice assistant service may be an AI model to which an AI algorithm is applied.

A character specialized model is a model for the voice assistant service and is an AI model in which characteristics are reflected in a predetermined character. The character specialized model may be an AI model trained on criteria and methods for providing a character specialized response message to the user, by using, for example, characteristics of a character, characteristics of the user who prefers the character, content information related to the character, etc. The character specialized model may be used independently, in parallel, or subsidiarily with respect to the model of the voice assistant service. The models constituting the character specialized model may be an AI model to which an AI algorithm is applied.

Hereinafter, one or more embodiments will be described in detail with reference to the accompanying drawings.

FIG. 1 is a schematic diagram of a system for providing a voice assistant service according to an embodiment.

Referring to FIG. 1, the system for providing the voice assistant service may include a device 1000, a server 2000, and another device 3000.

The device 1000 may output a response message to a voice input of a user using a model of the voice assistant service to provide the voice assistant service. The model of the voice assistant service may be a basic model used by a voice assistant program installed by default in the device 1000. In addition, the device 1000 may receive a character specialized model for a predetermined character and install the character specialized model in the device 1000, and may provide a voice assistant service specialized in the predetermined character by using the character specialized model.

The server 2000 may provide, to the other device 3000 of a third party, a model generation tool for generating the character specialized model to be used in the voice assistant service and receive the character specialized model generated by the other device 3000 from the other device 3000. In addition, the server 2000 may provide the received character specialized model to the device 1000. The model generation tool for generating the character specialized model may be, for example, a software development kit (SDK), and may provide a plurality of functions for generating the character specialized model. The server 2000 may be a server for providing the voice assistant service, but is not limited thereto. The server 2000 may include, for example, a server for providing an application to a device, a server for providing theme data of an operating system (OS) installed in the device to the device, etc.

The other device 3000 may generate the character specialized model using the model generation tool for generating the character specialized model. The other device 3000 may receive the character specialized model from the server 2000 or obtain the character specialized model from another source. The other device 3000 may be a device of a third party or a device of a general user. The model generation tool may include an SDK that enables one or more models to be generated with respect to functions for providing the voice assistant service. The other device 3000 may provide the character specialized model to the device 1000 through the server 2000 or through another server.

The device 1000 may be a smart phone, a tablet personal computer (PC), a PC, a smart television (TV), a mobile phone, a personal digital assistant (PDA), a laptop, a media player, a server, a micro server, a global positioning system (GPS) device, an e-book terminal, a digital broadcast terminal, a navigation device, a kiosk, an MP3 player, a digital camera, a consumer electronics device, another mobile or non-mobile computing device, etc., but the disclosure is not thereto. The device 1000 and the other device 3000 may include all kinds of devices capable of transmitting and receiving data through a network with the server 2000.

The network may include a local area network (LA/V), a wide area network (WA/V), a value added network (VA/V), a mobile radio communication network, a satellite communication network, and a mutual combination of these, may be a data communication network having a comprehensive meaning for allowing each network constituent shown in FIG. 1 to communicate smoothly with each other, and may include a wired Internet, a wireless Internet, and a mobile wireless communication network.

Figure 2:
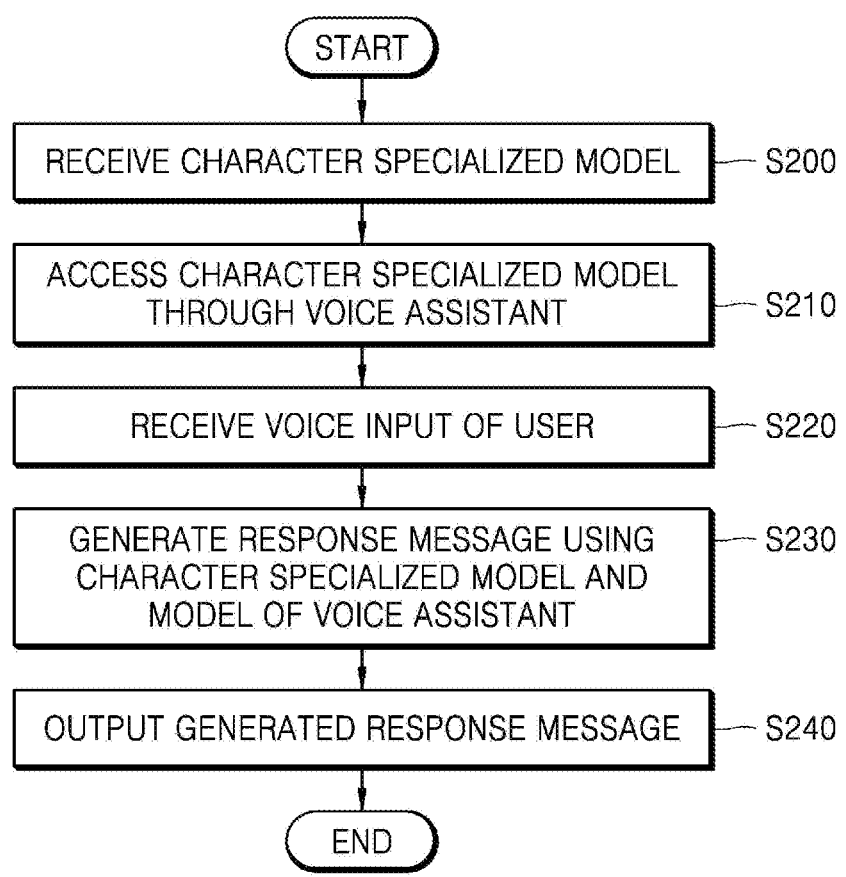
FIG. 2 is a flowchart of a method, performed by a device, of providing a voice assistant service using a character specialized model according to an embodiment.

FIG. 2 is a flowchart of a method, performed by the device 1000, of providing a voice assistant service using a character specialized model according to an embodiment.

In operation S200, the device 1000 may receive the character specialized model. The device 1000 may receive the character specialized model generated by the other device 3000 from the server 2000. In this case, the device 1000 may display a character model list provided by the server 2000 and download the character specialized model from the server 2000 based on a selection input of a user.

In addition, the device 1000 may receive the character specialized model generated by the other device 3000 from a predetermined product. For example, when the device 1000 approaches a product including a short range communication function (such as Near Field Communication (NFC), Bluetooth, etc.) and a data storage function, the device 1000 may establish short range communication with the product. In this case, the product may be implemented as, for example, an electronic product including a character doll, a character toy, a key ring, a tag product, and a speaker, but is not limited thereto. In addition, the device 1000 may receive a character specialized model stored in the product from the product through short range communication. Alternatively, link information for downloading the character specialized model may be stored in the product, and the device 1000 may receive the link information stored in the product from the product and download the character information model using the received link information.

In operation S210, the device 1000 may access the character specialized model through a voice assistant program. The device 1000 may execute the voice assistant program installed in the device 1000 and access the character specialized model through the executed voice assistant program. The device 1000 may select one of a plurality of character specialized models installed in the device 1000 based on a user input, and access the selected character specialized model. The user input for selecting one of the plurality of character specialized models may be a voice input of the user. For example, the device 1000 may receive the voice input of the user who speaks a call name or identifier corresponding to a predetermined character. The voice assistant program may be implemented as an application running on an operating system (OS), and may be implemented as a software module constituting middleware.

In operation S220, the device 1000 may receive a voice input of the user. The device 1000 may receive the voice input of the user to provide the voice assistant service. Operations S210 and S220 may be performed in separate operations, but may also be performed in a seamless operation. For example, in operation S210, after a user input such as "You are now Pororo" for selecting one of the character specialized models is received and one of the character specialized models is selected, in operation S220, the voice input of the user such as "How is the weather today?" for requesting the voice assistant service may be received. In addition, when operation S210 and operation S220 are seamlessly performed and an input such as "Pororo, how is the weather today?" for selecting one of the character specialized models and the input for requesting the voice assistant service are received together, the device 1000 may analyze this to select one of the character specialized models, and specify content of a service to be provided through the voice assistant program.

The content of the service to be provided through the voice assistant program may be obtained by analyzing a user utterance through natural language understanding (NLU). The device 1000 may specify content of the service by obtaining intent and slot information related to the intent in the user utterance. For example, when the device 1000 obtains an utterance "How is the weather today?" through an automatic response system (ASR), the device 1000 may identify that the intent is a "weather search" and that the slot is "today's weather" through NLU. NLU is a model trained with sample sentences and the intent/slot meaning for each sample sentence and may be combined with an AI technology. When the intent and the slot are obtained through NLU, the voice assistant program may interoperate with an application capable of providing a service corresponding to the obtained intent. For example, when the obtained Intent is the "weather search," the voice assistant program may operate in connection with a weather application. The Intent "weather search" and the slot "today's weather" may be converted into API data for "searching for today's weather and obtaining results" according to an API of the weather application and the API data may be transferred to the weather application. The API data may have a different form for each application, and data conversion to the API data may be performed through a separate program for converting the intent/slot into API data of a specific application.

The weather application may receive the API data, search for information about today's weather, and transfer search results to the voice assistant program. The search results transferred to the voice assistant program may be the API data of the weather application, and the voice assistant program may convert the transferred search results into data in the form of a natural language. A data conversion job may be performed by the voice assistant program, but may be performed by a separately provided program for data conversion. Although an example of providing the voice assistant service in relation to the weather application is described, the voice assistant service may be provided in the same or similar manner to other applications.

In operation S230, the device 1000 may generate a response message using the character specialized model and the model of the voice assistant. The device 1000 may interpret the voice input of the user and generate the response message to the voice input of the user by using the character specialized model and the model of the voice assistant.

The device 1000 may use data obtained from an application corresponding to the content of the service to generate the response message. The device 1000 may change or convert the data obtained from the application into data in the form that the voice assistant program may process and then generate the response message using the changed data. The generation of the response message may be performed by dialog management (DM) and natural language generation (NLG), such that when DM determines a type of the response message, NLG may generate the response message in the form suitable for the type of the response message. DM may be a model trained using a sample dialogue consisting of questions and answers, and may be combined with an AI technology. NLG may be a model trained using data to be included in a response and sample data consisting of natural language sentences corresponding to the data, and may be combined with an AI technology. For example, the device 1000 may generate the response message using the search results transferred from the weather application. When the weather application transfers the search results (e.g., sunny) of today's weather to the voice assistant program, the DM of the voice assistant program may output a result that the type of the response to a weather search request is a weather search result transfer. In addition, the NLG of the voice assistant program may receive the output result to generate a sentence for the weather search result transfer. As a result of generating the sentence, a sentence may be determined in the form most suitable for the type of the weather search result transfer, and the search result of today's weather obtained from the weather application may be reflected to the determined sentence such that a response sentence (e.g., "today's weather is sunny") may be generated.

The device 1000 may apply the voice input of the user or text converted from the voice input of the user to the character specialized model and the model of the voice assistant program to obtain a response message output from the character specialized model and the model of the voice assistant program. When the NLG of the voice assistant generates the sentence "Today's weather is sunny" that is the general message of the voice assistant, NLG of the character specialized model may receive the generated sentence. In addition, the character specialized model may change the input sentence to a character specialized response message "It is sunny weather to go out and play with friends."

Instead of using the NLG of the voice assistant, the device 100 may use only the NLG of the character specialized model to immediately generate the character specialized response message "It is sunny weather to go out and play with friends." In addition, an NLG model of the voice assistant may be trained to reflect a characteristic of a character and changed to a character specialized NLG model, and the character specialized response message may be generated through the NLG model of the voice assistant changed to reflect the characteristic of the character.

In addition, a TTS of the voice assistant may determine an output characteristic of the response message as a general voice characteristic of the voice assistant, and a TTS of the character specialized model may receive the characteristic to determine the output characteristic reflecting the characteristic of the character. The TTS of the character specialized model may receive the character specialized response message generated by the NLG of the character specialized model, determine the output characteristic reflecting the characteristic of the character, and output a response message to reflect the characteristic of the character.

In this case, the response message to the voice input of the user may reflect, for example, the characteristic of the character, a characteristic of the user who prefers the character, content information related to the character, etc. In addition, the response message to the voice input of the user may include an expression according to a tone of the character. Further, when the response message is output as sound, the response message may include information about the tone such that the response message may be output according to the tone of the character.

The model of the voice assistant service may include, for example, an ASR model for recognizing the voice input of the user, an NLU model for interpreting the voice input of the user, a DM model for determining a type of the response message, an NLG model for generating the response message, and a TTS model for determining the output characteristic of the response message, but is not limited thereto.

Also, the character specialized model may include, for example, an ASR model for recognizing the voice input of the user, an NLU model for interpreting the voice input of the user, a DM model for determining a type of the response message, an NLG model for generating the response message, and a TTS model for determining the output characteristic of the response message, but is not limited thereto. The character specialized model may be used independently, in parallel, or subsidiarily with respect to the model of the voice assistant service.

In operation S240, the device 1000 may output the generated response message. The device 1000 may display the text of the response message on a screen of the device 1000. The device 1000 may also or alternatively output sound of the response message through a speaker of the device 1000.

Figure 3:
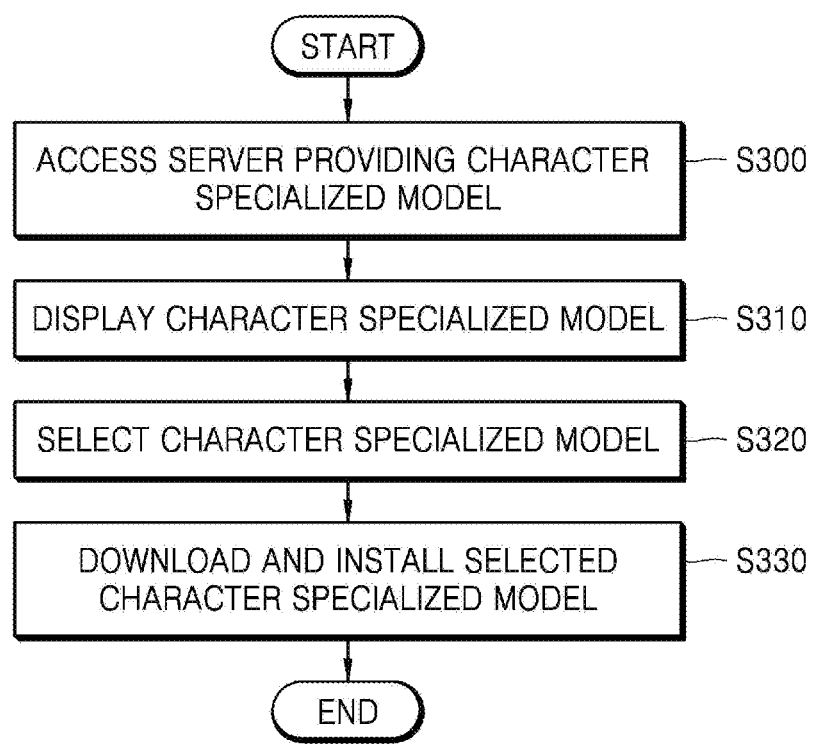
FIG. 3 is a flowchart of a method, performed by a device, of downloading a character specialized model from a server according to an embodiment.

FIG. 3 is a flowchart of a method, performed by the device 1000, of downloading a character specialized model from the server 2000 according to an embodiment.

In operation S300, the device 1000 may access the server 2000 that provides the character specialized model. The device 1000 may access the server 2000 that provides the character specialized model by selecting a predetermined object on an execution screen of a voice assistant. In addition, the device 1000 may access the server 2000 that provides the character specialized model by selecting a predetermined object on a screen for changing a theme of an operating system (OS) installed in the device 1000. Further, the device 1000 may access the server 200 that provides the character specialized model by receiving a user voice input.

The server 2000 that provides the character specialized model may be a server that provides a voice assistant service. In addition, the device 1000 may access an application providing server, such as an app market, that provides an application, to obtain the character specialized model.

In operation S310, the device 1000 may display a list of character specialized models. When a user input for selecting the predetermined object on the execution screen of the voice assistant is received, the device 1000 may display the list of the character specialized models provided by the server 2000. Alternatively, when the predetermined object on the screen for changing the theme of the OS installed in the device 1000 is selected, the list of character specialized models may be displayed together with a theme list of the OS. In addition, the character specialized model may be included in the theme of the OS. The list of character specialized models may be, for example, a list including a name of a character, but is not limited thereto.

In operation S320, the device 1000 may select the character specialized model. The device 1000 may receive a user input for selecting a predetermined character specialized model from the list of character specialized models, and select the character specialized model according to the received user input.

In operation S330, the device 1000 may download and install the selected character specialized model. The device 1000 may request the selected character specialized model from the server 2000 and receive the selected character specialized model from the server 2000. In addition, the device 1000 may install the received character specialized model in the device 1000. The device 1000 may install the character specialized model in the device 1000 such that the character specialized model may interoperate with a model of the voice assistant in the device 1000. An operation in connection with the model of the voice assistant will be described in detail below.

Figure 4:
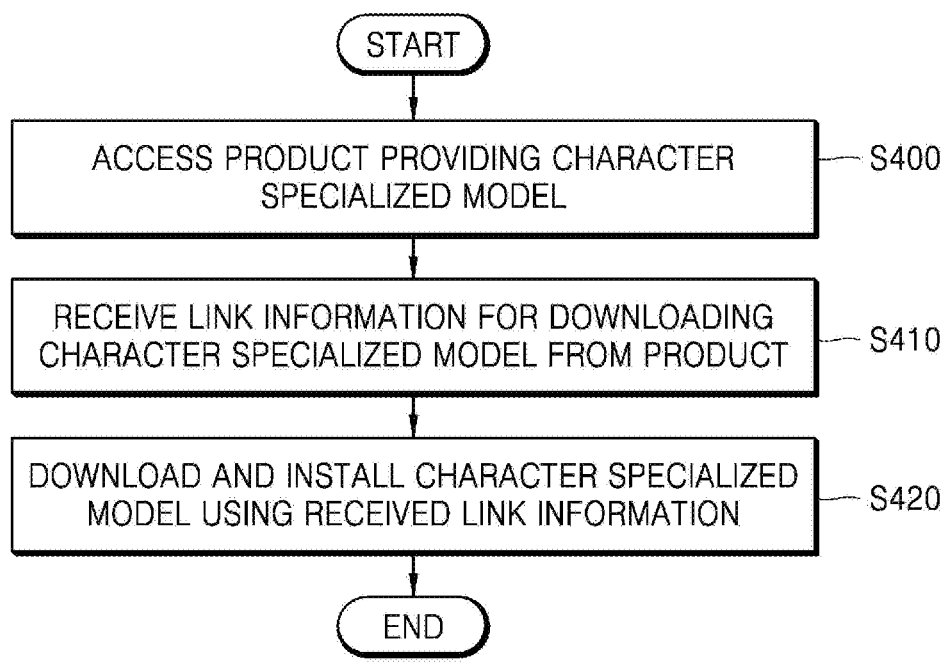
FIG. 4 is a flowchart of a method, performed by a device, of downloading a character specialized model by approaching a predetermined product according to an embodiment.

FIG. 4 is a flowchart of a method, performed by the device 1000, of downloading a character specialized model by approaching a predetermined product according to an embodiment.

In operation S400, the device 1000 may approach the product that provides the character specialized model. The product that provides the character specialized model may include a device including a short range communication function and a data storage function. The product that provides the character specialized model may be implemented as, for example, a character doll, a character toy, a key ring, a tag product, and an electronic product including a speaker, but is not limited thereto. Because the device 1000 approaches a communication range of the product that provides the character specialized model, the device 1000 may establish short range communication with the product that provides the character specialized model.

In operation S410, the device 1000 may receive link information for downloading the character specialized model from the product. The product that provides the character specialized model may store the link information of a source providing the character specialized model, and the device 1000 may receive the link information through short range communication formed with the product.

In operation S420, the device 1000 may download and install the character specialized model using the received link information. The device 1000 may access the server 2000 that provides the character specialized model by using the received link information, and may receive the character specialized model provided from the server 2000. In addition, the device 1000 may install the received character specialized model in the device 1000. The device 1000 may install the character specialized model in the device 1000 such that the character specialized model may interoperate with a model of a voice assistant in the device 1000.

Meanwhile, the device 1000 is described above as receiving the link information of the character specialized model from the product that provides the character specialized model above, but is not limited thereto in one or more other embodiments. For example, according to another embodiment, the device 1000 may directly receive the character specialized model from the product that provides the character specialized model. In this case, the device 1000 may update the character specialized model installed in the device 1000 through the other device 3000 of a third party that generates the character specialized model.

Figure 5:
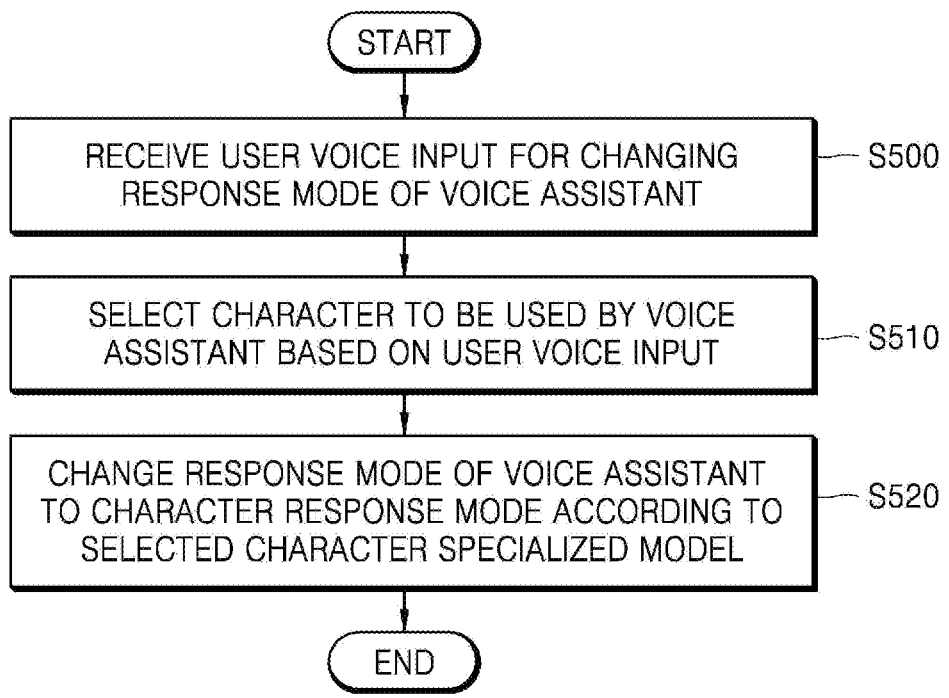
FIG. 5 is a flowchart of a method, performed by a device, of changing a response mode of a voice assistant according to an embodiment.

FIG. 5 is a flowchart of a method, performed by the device 1000, of changing a response mode of a voice assistant according to an embodiment.

In operation S500, the device 1000 may receive a voice input of a user for changing the response mode of the voice assistant. The device 1000 may install a character specialized model and set a call name for calling or executing the installed character specialized model. In addition, the device 1000 may receive a voice input of the user for calling the set call name. For example, the device 1000 may set "Pororo" as a call name for calling or executing a character specialized model for a character "Pororo." When it is determined that a voice input of the user for calling "Pororo" is received, the character specialized model for the Pororo character may be called or executed.

In operation S510, the device 1000 may select a character specialized model to be used for the voice assistant based on the voice input of the user. The device 1000 may compare the voice input of the user with the call name of the character specialized model set in the device 1000. For example, the device 1000 may convert the voice input of the user into text, and compare the converted text with the call name of the character specialized model set in the device 1000. The device 1000 may select a character specialized model corresponding to the voice input of the user based on a comparison result. In particular, when a plurality of character specialized models are installed, the call name may be used to select one of the plurality of character specialized models. For example, when the voice input of the user for calling "Pororo" is received, the device 1000 may select the character specialized model for Pororo from among the plurality of character specialized models.

In operation S520, the device 1000 may change the response mode of the voice assistant to a character response mode according to the selected character specialized model. When the character specialized model for Pororo is selected according to the voice input of the user for calling Pororo, the device 1000 may change the response mode of the voice assistant to a Pororo response mode.

Figure 6:
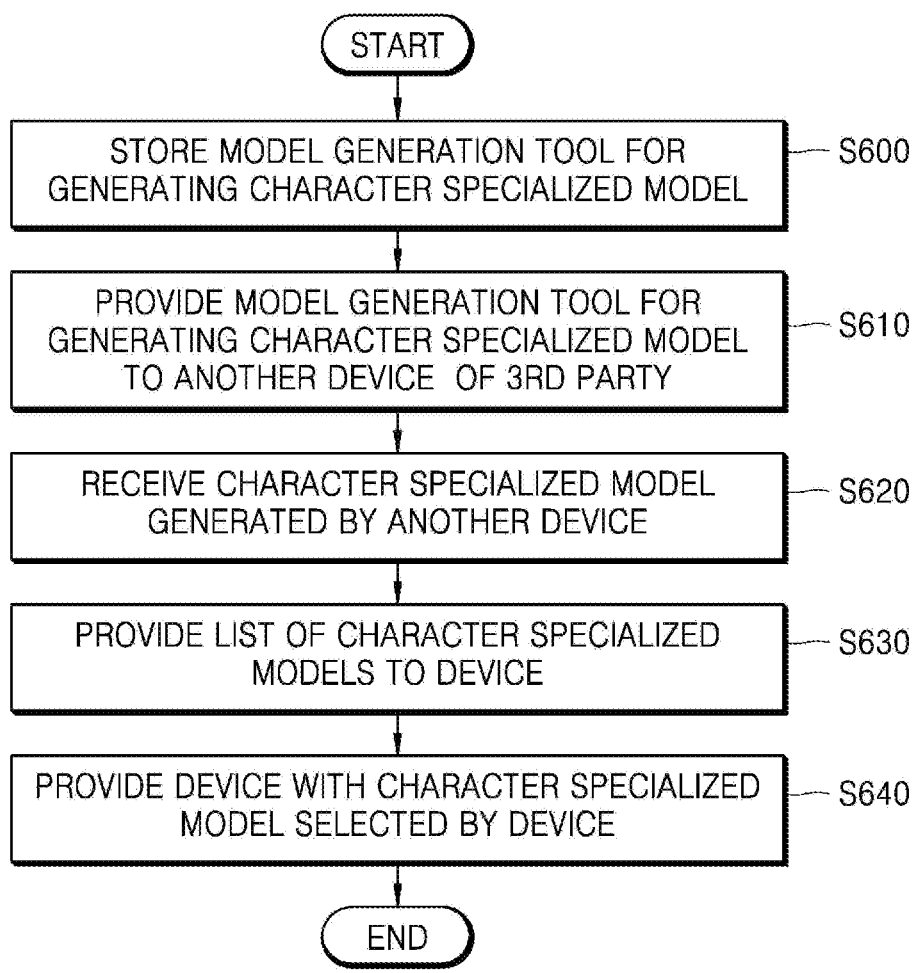
FIG. 6 is a flowchart of a method, performed by a server, of providing a model generation tool to another device and providing a character specialized model generated by the other device to a device according to an embodiment.

FIG. 6 is a flowchart of a method, performed by the server 2000, of providing a model generation tool to the other device 3000 and providing a character specialized model generated by the other device 3000 to the device 1000 according to an embodiment.

In operation S600, the server 2000 may store the model generation tool for generating the character specialized model. The model generation tool may be a training model generation tool for generating the character specialized model. The model generation tool may be, for example, an SDK, and may provide a plurality of functions for generating the character specialized model. The model generation tool may include, for example, a function for generating an ASR model for recognizing a voice input of a user, a function for generating an NLU model for interpreting the voice input of the user, a function for generating a DM model for determining a type of a response message, a function for generating an NLG model for generating the response message, and a function for generating a TTS model for determining a voice characteristic of the response message, but is not limited thereto.

In operation S610, the server 2000 may provide the model generation tool for generating the character specialized model to the other device 3000 of, for example, a third party. A user of the other device 3000 may generate a model specialized for a character and provide a service regarding the character, and the other device 3000 may access the server 2000 and request the model generation tool from the server 2000.

In operation S620, the server 2000 may receive the character specialized model generated by the other device

3000. The other device 3000 may generate the character specialized model using the model generation tool, and upload the generated character specialized model to the server 2000. The character specialized model may include, for example, an ASR model for recognizing the voice input of the user, an NLU model for interpreting the voice input of the user, a DM model for determining a type of the response message, an NLG model for generating the response message, and a TTS model for determining the voice characteristic of the response message, but is not limited thereto. The server 2000 may store the received character specialized model in a DB for each third party.

In operation S630, the server 2000 may provide the device 1000 with a list of character specialized models, and, in operation S640, the server 2000 may provide the device 100 with the character specialized model selected by the device 1000 from the list of character specialized models.

Figure 7:
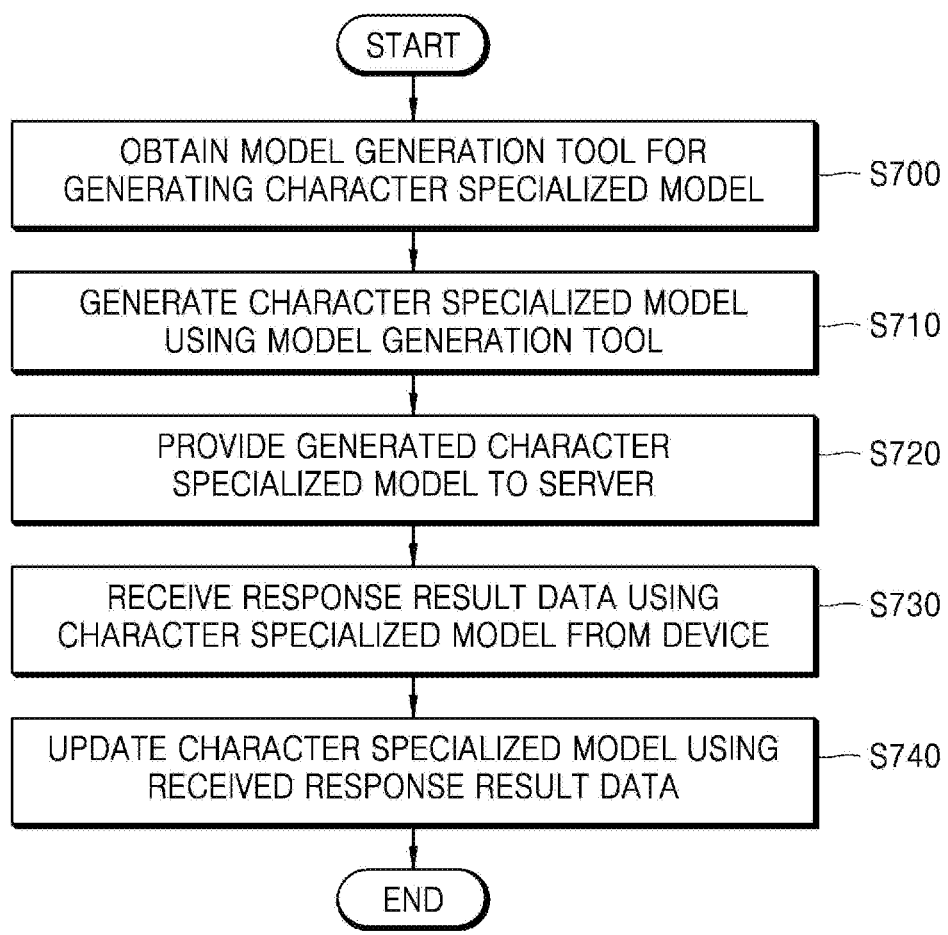
FIG. 7 is a flowchart of a method, performed by another device, of generating and updating a character specialized model using a model generation tool according to an embodiment.

FIG. 7 is a flowchart of a method, performed by the other device 300, of generating and updating a character specialized model using a model generation tool according to an embodiment.

In operation S700, the other device 3000 may obtain the model generation tool for generating the character specialized model. For example, the other device 3000 may request the model generation tool for generating the character specialized model from the server 2000 and receive the model generation tool from the server 2000. Alternatively, the other device 3000 may receive the model generation tool from another source that provides the model generation tool for generating the character specialized model.

In operation S710, the other device 3000 may generate the character specialized model using the model generation tool. The model generation tool may include, for example, a function for generating an ASR model for recognizing a voice input of a user, a function for generating an NLU model for interpreting the voice input of the user, a function for generating a DM model for determining a type of a response message, a function for generating an NLG model for generating the response message, and a function for generating a TTS model for determining a voice characteristic of the response message, but is not limited thereto.

The other device 3000 may generate the character specialized model by training the character specialized model using training data related to the character, by using the model generation tool. For example, the other device 3000 may generate the character specialized model by training an ASR model for recognizing the voice input of the user, an NLU model for interpreting the voice input of the user, a DM model for determining a type of the response message, an NLG model for generating the response message, and a TTS model for determining the voice characteristic of the response message, by using tone data related to the character, intonation data of the character, a dialogue script about the character, content information related to the character, question answering (QNA) data related to the character, and relation information related to the character.

The character specialized model may include call name information and a call name recognition model for calling the corresponding character specialized model. The call name information and the call name recognition model for calling the corresponding character specialized model may be included in a model of a voice assistant service.

In operation S720, the other device 3000 may provide the generated character specialized model to the server 2000. The other device 3000 may register the generated character specialization model with the server 2000.

In operation S730, the other device 3000 may receive response result data using the character specialized model from the device 1000. The character specialized model may be provided to the device 1000 from the server 2000, and the device 1000 may use the character specialized model through a voice assistant application in the device 1000. In addition, the device 1000 may provide the voice assistant service based on the character specialized model to the user. In this case, the device 1000 may store dialogue content exchanged with the user through the voice assistant service and an operation history of the device 1000. In addition, the device 1000 may provide response result data including the dialogue content between the user and the device 1000 and the operation history of the device 1000 to the other device 3000 and the server 2000. The device 1000 may provide the response result data to the other device 3000 and the server 2000 in the form of big data. For example, the device 1000 may provide the response result data other than data related to personal privacy such as a user ID, a phone number, etc., to the other device 3000 and the server 2000.

In operation S740, the other device 3000 may update the character specialized model using the received response result data. The other device 3000 may update the character specialized model by further training the character specialized model using the received response result data. For example, the other device 3000 may retrain at least one of an ASR model for recognizing the voice input of the user, an NLU model for interpreting the voice input of the user, a DM model for determining a type of the response message, an NLG model for generating the response message, and a TTS model for determining the voice characteristic of the response message, by using the response result data.

Figure 8:
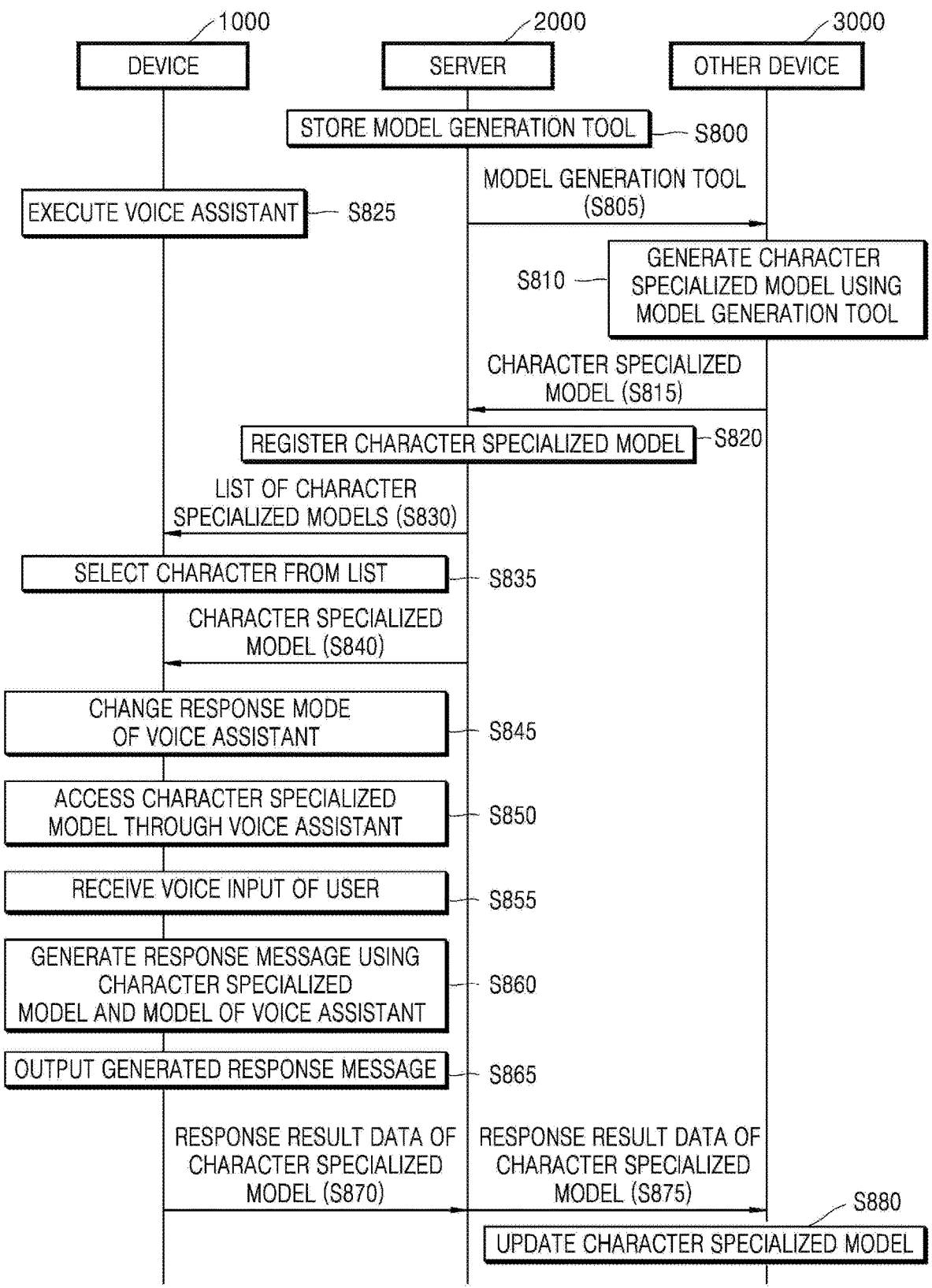
FIG. 8 is a flowchart of a method, performed by a device, a server, and another device, of providing a voice assistant service according to an embodiment.

FIG. 8 is a flowchart of a method, performed by the device 1000, the server 2000, and the other device 3000, of providing a voice assistant service according to an embodiment.

In operation S800, the server 2000 may store a model generation tool. The server 2000 may store the model generation tool used to generate a character specialized model. The character specialized model may include a plurality of sub models for data analysis and generation required or used to provide the voice assistant service specialized for a character. In addition, the model generation tool may provide functions for generating the character specialized model including the plurality of sub models.

In operation S805, the server 2000 may provide the model generation tool to the other device 3000. The server 2000 may provide a service for distributing the model generation tool to the other device 3000. The other device 3000 may access the server 2000 to download the model generation tool.

In operation S810, the other device 3000 may generate the character specialized model by using the model generation tool, and in operation S815, the other device 3000 may transmit the character specialized model to the server 2000.

In operation S820, the server 2000 may register the character specialized model. The server 2000 may operate a separate DB for managing the character specialized model. In addition, the server 2000 may register and manage the character specialized model in the DB according to the other device 3000 or according to each character.

In operation S825, the device 1000 may execute a voice assistant application. The voice assistant application may be an assistant program installed in the device 1000 by a manufacturer of the device 1000, but is not limited thereto.

In operation S830, the server 2000 may transmit a list of character specialized models to the device 1000, in operation S835, the device 1000 may select a character from the list, and in operation S840, the server 2000 may transmit the selected character specialized model to the device 1000.

The server 2000 may provide the list of character specialized models to the device 1000, and transmit the character specialized model selected by the device 1000 from the list of character specialized models to the device 1000. Also, the character specialized model may be included in a theme of an OS of the device 1000, and the server 2000 may provide a theme list of the OS to the device 1000. In this case, the device 1000 may select a predetermined theme from the theme list, and the server 2000 may provide the selected theme to the device 1000 to provide a character specialized model in the theme to the device 1000.

In operation S845, the device 1000 may change a response mode of a voice assistant. The device 1000 may change the response mode of the voice assistant based on a user input. For example, when a voice input of a user calling a predetermined call name is input, the device 1000 may recognize the call name of the voice input to change the response mode of the voice assistant to a response mode of a character corresponding to the call name.

For example, when a voice input of a call name "Pororo" is input to the device 1000, the device 1000 may change the response mode of the voice assistant to a Pororo response mode. When the character specialized model is provided together with the theme of the OS of the device 1000, the device 1000 may change the theme of the OS to a Pororo theme together while changing the response mode of the voice assistant to the Pororo response mode.

In operation S850, the device 1000 may access the character specialized model through the voice assistant application. The voice assistant application may use the character specialized model and a model of the voice assistant together to provide the voice assistant service.

In operation S855, the device 1000 may receive a voice input of the user. The user may input a voice to the device 1000 to receive the voice assistant service.

In operation S860, the device 1000 may generate a response message by using the character specialized model and the model of the voice assistant. The device 1000 may use the character specialized model and the model of the voice assistant together to interpret the meaning of the voice input of the user, generate the response message to be responded to the user, and determine a voice characteristic of the response message. In addition, the device 1000 may determine a response operation of the device 1000 by using the character specialized model and the model of the voice assistant together.

In operation S865, the device 1000 may output the generated response message. The device 1000 may display a response message in a text format on a screen of the device 1000. In addition, the device 1000 may output a response message in a sound format through a speaker of the device 1000. Further, the device 1000 may control the operation of the device 1000 according to the determined response operation of the device 1000.

In operation S870, the device 1000 may provide response result data of the character specialized model to the server 2000, and in operation S875, the server 2000 may provide the response result data of the character specialized model to the other device 3000. The response result data may include, for example, data about a dialogue between the user and the device 1000 and the response operation of the device 1000. Alternatively, the device 1000 may transmit the response result data of the character specialized model to the other device 3000.

In operation S880, the other device 3000 may update the character specialized model. The other device 3000 may update the character specialized model by further training the character specialized model using the received response result data. The other device 3000 may update the character specialized model according to the user or according to the device 1000 and manage the updated character specialized model.

Meanwhile, the device 1000 may update the character specialized model in the device 1000 by using the response result data of the character specialized model.

Figure 9:
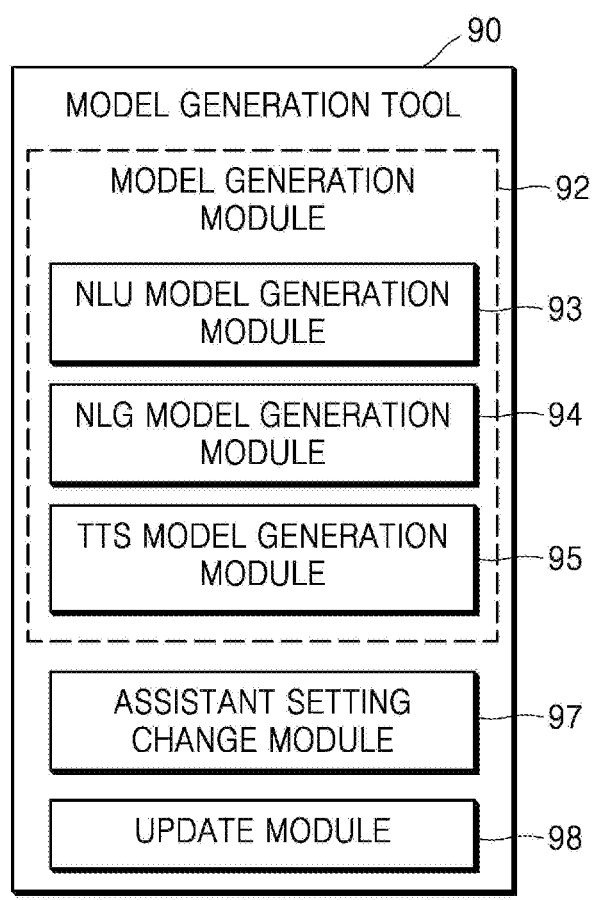
FIG. 9 is a block diagram of a model generation tool according to an embodiment.

FIG. 9 is a block diagram of a model generation tool 90 according to an embodiment.

Referring to FIG. 9, the model generation tool 90 may include a model generation module 92, an assistant setting change module 97, and an update module 98.

The model generation module 92 may provide functions for generating a character specialized model. Modules for generating a plurality of sub models included in the character specialized model may be included. The model generation module 92 may include an NLU model generation module 93, an NLG model generation module 94, and a TTS model generation module 95.

The NLU model generation module 93 may generate a model for interpreting a voice input of a user in consideration of characteristics of a character. The model for interpreting the voice input of the user may be a training model for analyzing the meaning of the voice input of the user, or may be a model combined with an AI algorithm. The other device 3000 may input, for example, a dialogue script about the character, tone data related to the character, intonation data of the character, content information related to the character, and QNA data related to the character to the NLU model generation module 93, thereby generating and training a training model for interpreting the voice input of the user.

The NLG model generation module 94 may generate a model for generating a response message with respect to the voice input of the user. The model for generating the response message with respect to the voice input of the user may be a training model for generating the response message with respect to the voice input of the user and determining a response operation of the device 1000. The other device 3000 may input, for example, a dialogue script about the character, tone data related to the character, intonation data of the character, content information related to the character, and QNA data related to the character to the NLG model generation module 94, thereby generating and training a model for generating the response message with respect to the voice input of the user. In addition, the other device 3000 may input user information of the device 1000 and context information related to the device 1000 to the NLG model generation module 94, thereby training and generating a model for generating the response message with respect to the voice input of the user. Accordingly, the model for generating the response message may generate the response message to be provided to the user by reflecting a situation of the user, a situation of the device 1000, and the characteristic of the character. In this case, the response message may be generated to reflect the tone of the character.

The TTS model generation module 95 may generate a model for determining a voice characteristic of the response message. The model for determining the voice characteristic of the response message may be used to determine the voice characteristic of the response message by reflecting the voice characteristic of the character. The other device 3000 may input, for example, a dialogue script about the character, tone data related to the character, intonation data of the character, content information related to the character, and QNA data related to the character to the TTS model generation module 95, thereby training and generating a model for determining the voice characteristic of the response message by reflecting the voice characteristic of the character. Accordingly, the model for determining the voice characteristic of the response message may allow sound of the response message to be output through the speaker of the device 1000 according to the intonation and tone of the character.

Meanwhile, the model generation tool 92 may further include an ASR model generation module and a DM model generation module. The ASR model generation module may generate an AI model for recognizing the voice input of the user in consideration of characteristics of the character. The other device 3000 may input, for example, a dialogue script about the character, tone data related to the character, intonation data of the character, content information related to the character, and QNA data related to the character to the ASR model generation module, thereby generating and training a training model for recognizing the voice input of the user. The DM model generation module may generate an AI model for determining a type of the response message in consideration of the characteristics of the character. The other device 3000 may input, for example, a dialogue script about the character, tone data related to the character, intonation data of the character, content information related to the character, and QNA data related to the character to the DM model generation module, thereby generating and training a training model for determining the type of the response message.

In the model generation module 92 of the present embodiment, the NLU model generation module 93, the NLG model generation module 94, the TTS model generation module 95, the ASR model generation module, and the DM model generation module operate separately, but are not limited thereto. For example, the model generation module 92 may include a module into which at least two of the NLU model generation module 93, the NLG model generation module 94, the TTS model generation module 95, the ASR model generation module, or the DM model generation module are integrated.

The assistant setting change module 97 may provide a function of changing a setting value set in a voice assistant. The other device 3000 may change a call name for calling the character specialized model, a setting value related to the response mode of the character specialized model, etc., by using the assistant setting change module 97. The response mode of the character specialized model may include, for example, a dialogue mode, a secretary or personal assistant mode, a training mode, and a play mode, but is not limited thereto. The dialogue mode may be a mode for providing a general dialogue with the user, the secretary mode may be a mode for managing a schedule of the user, the training mode may be a mode for study or training of the user, and the play mode may be a mode for providing a game with the user.

The update module 98 may provide a function for updating the character specialized model. The other device 3000 may update the character specialized model using the update module 98.

Figure 10:
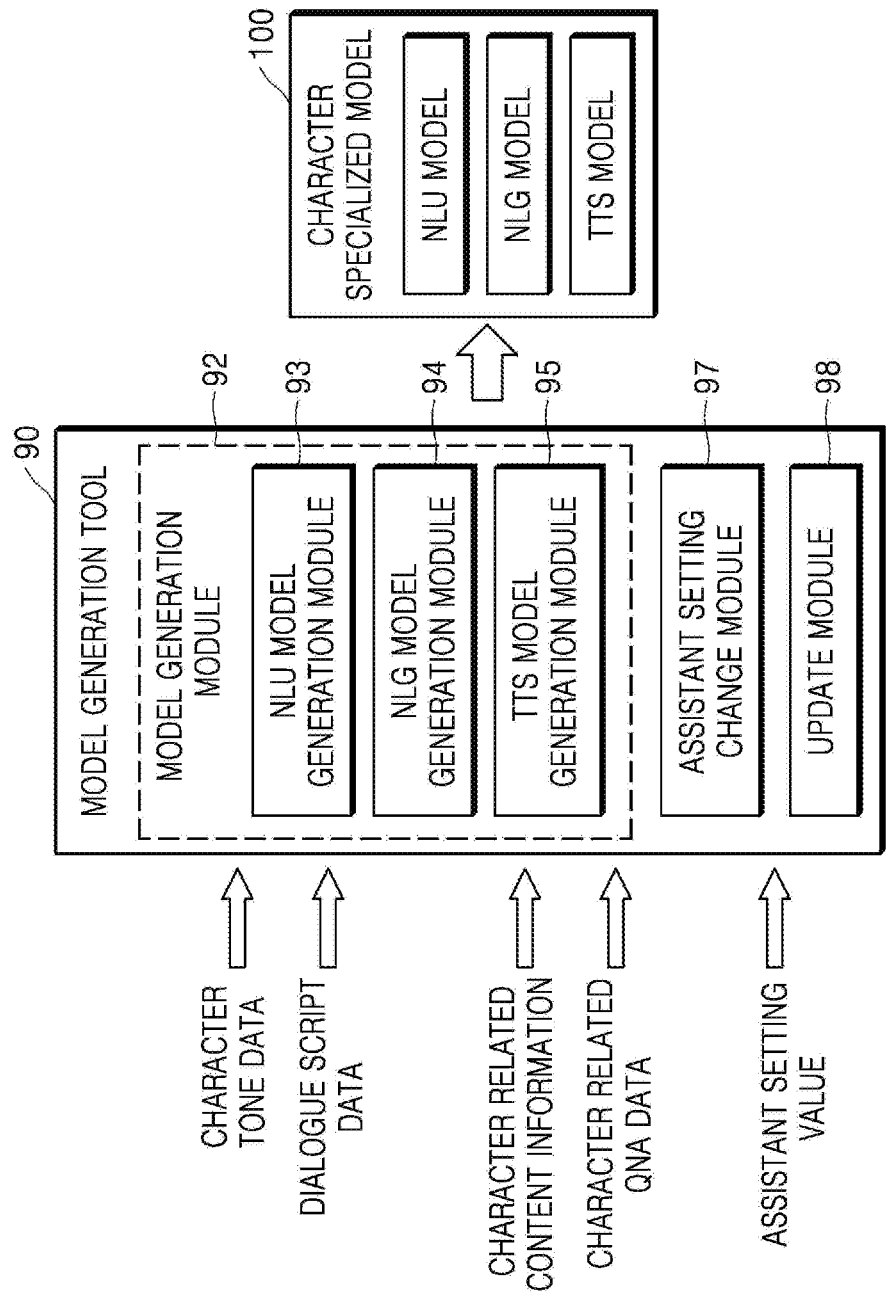
FIG. 10 is a diagram illustrating an example of generating a character specialized model using a model generation tool according to an embodiment.

FIG. 10 is a diagram illustrating an example of generating a character specialized model 100 using the model generation tool 90 according to an embodiment.

Referring to FIG. 10, the other device 3000 may input various training data into the model generation tool 90 to generate the character specialized model 100. For example, the other device 3000 may input a dialogue script related to a character, tone data related to the character, intonation data of the character, content information related to the character, and QNA data related to the character to the model generation tool 90, thereby generating the character specialized model 100 through training.

The dialogue script related to the character may be data including dialogue content of the character. For example, the dialogue script related to the character may include, for example, dialogue content that Pororo talks in an animation, dialogue content the singer Psy talks on a broadcast, etc. The dialogue script related to the character may include, for example, dialogue content that the device 1000 talks with a user using the character specialized model 100.

The tone data of the character may be data including information related to tone of the character, and the intonation data of the character may be data including information related to intonation of the character.

The content information related to the character may include image data and voice data about the character. For example, the content information related to the character may include an animation image of Pororo, voice data of Pororo, news data about Pororo, interview voice data of the singer Psy, sound source data of the singer Psy, news data about the singer Psy, etc., but is not limited thereto.

The QNA data related to the character may include data about QNA exchanged with customers in a service related to the character.

In addition, the other device 3000 may input user information of the device 1000 and context information related to the device 1000 to the model generation tool 90 to generate the character specialized model 100 through training. The context information may include, for example, at least one of surrounding environment information of the device 1000, state information of the device 1000, state information of the user, usage history information of the device 1000 of the user, or schedule information of the user, but is not limited thereto. The surrounding environment information of the device 1000 refers to environment information within a predetermined radius from the device 1000, and may include, for example, at least one of weather information, temperature information, humidity information, illuminance information, noise information, sound information, etc., but is not limited thereto. The state information of the device 1000 may include mode information (e.g., a sound mode, a vibration mode, a silent mode, a power saving mode, a blocking mode, a multi window mode, an automatic rotation mode, etc.) of the device 1000, location information and time information of the device 1000, activation information (e.g., Wi-Fi ON/Bluetooth OFF/GPS ON/NFC ON, etc.) of a communication module, network connection state information of the device 1000, information (e.g., at least one of identification information of an application, a type of the application, a usage time of the application, a usage period of the application) of an application executed in the device 1000, etc., but is not limited thereto. The state information of the user is information about a movement of the user, lifestyle, etc., and may include information about a walking state of the user, an exercise state, a driving state, a sleep state, a mood state, etc., but is not limited thereto. The usage history information of the device 1000 of the user is information about a history of the user using the device 1000, and may include information about at least one of an execution history of the application, a history of a function executed in the application, a call history of the user, a text history of the user, etc., but is not limited thereto.

In addition, the other device 3000 may input an assistant setting value through a GUI provided by the assistant setting change module 97. Accordingly, the character specialized model 100 may include the assistant setting value. The assistant setting value may be subsidiary data to the character specialized model 100 and may be provided to the device 1000 together with the character specialized model 100.

Figure 11:
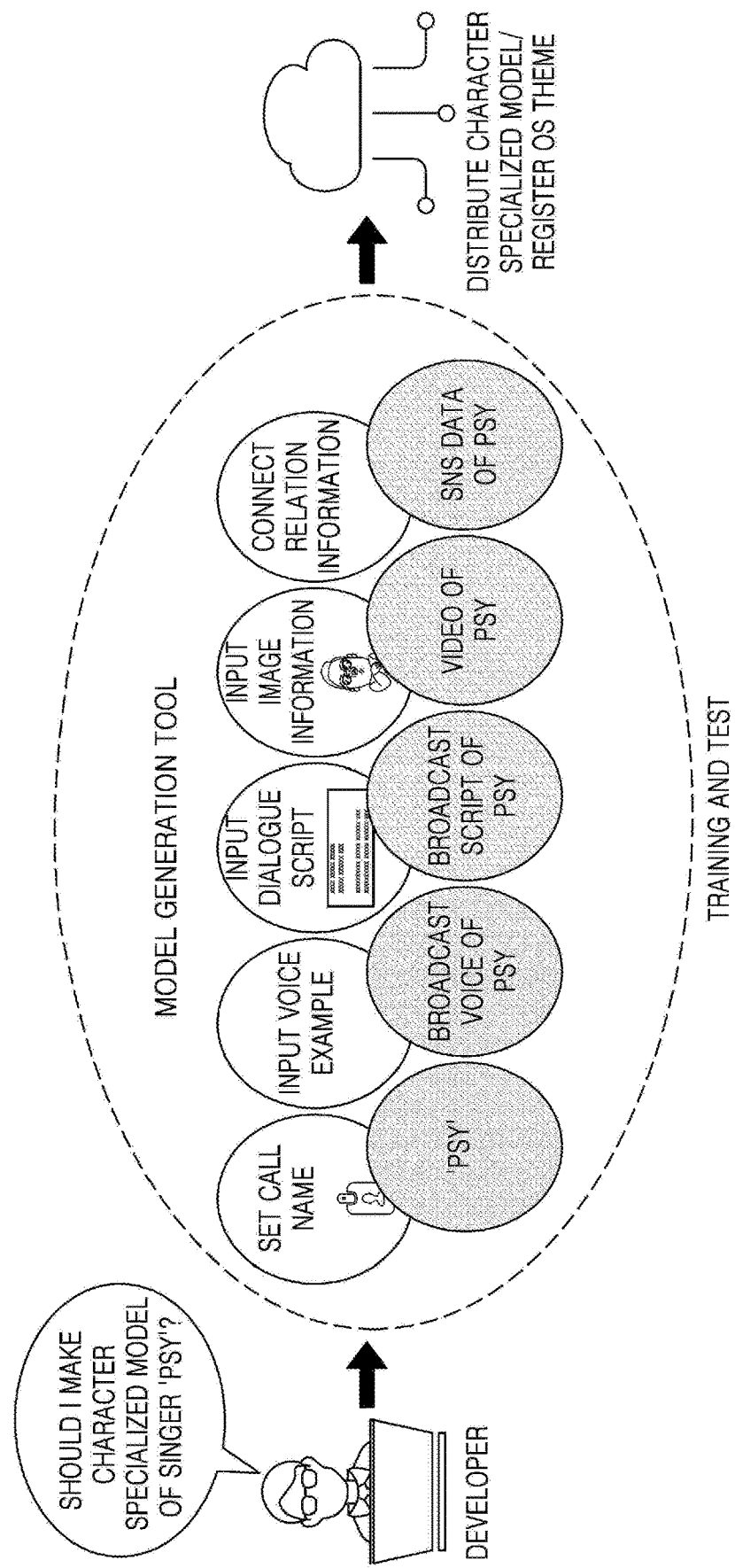
FIG. 11 is a diagram illustrating an example in which another device generates a character specialized model according to an embodiment.

FIG. 11 is a diagram illustrating an example in which the other device 3000 generates a character specialized model according to an embodiment.

Referring to FIG. 11, the other device 3000 of a developer of a character specialized model may generate a character specialized model of the singer Psy using various learning data.

The other device 3000 may set a call name for calling the character specialized model of the singer Psy as "Psy." In addition, the other device 3000 may input broadcast voice data of Psy into a model generation tool as a voice example. Furthermore, the other device 3000 may input a broadcast script of Psy into the model generation tool as a dialogue script. The other device 3000 may also input video of Psy into the model generation tool as image information. In addition, the other device 3000 may input social network system (SNS) data of Psy into the model generation tool as relation information.

The other device 3000 may distribute the generated character specialized model of Psy and register the character specialized model of Psy in an OS theme of the device 1000.

Figure 12:
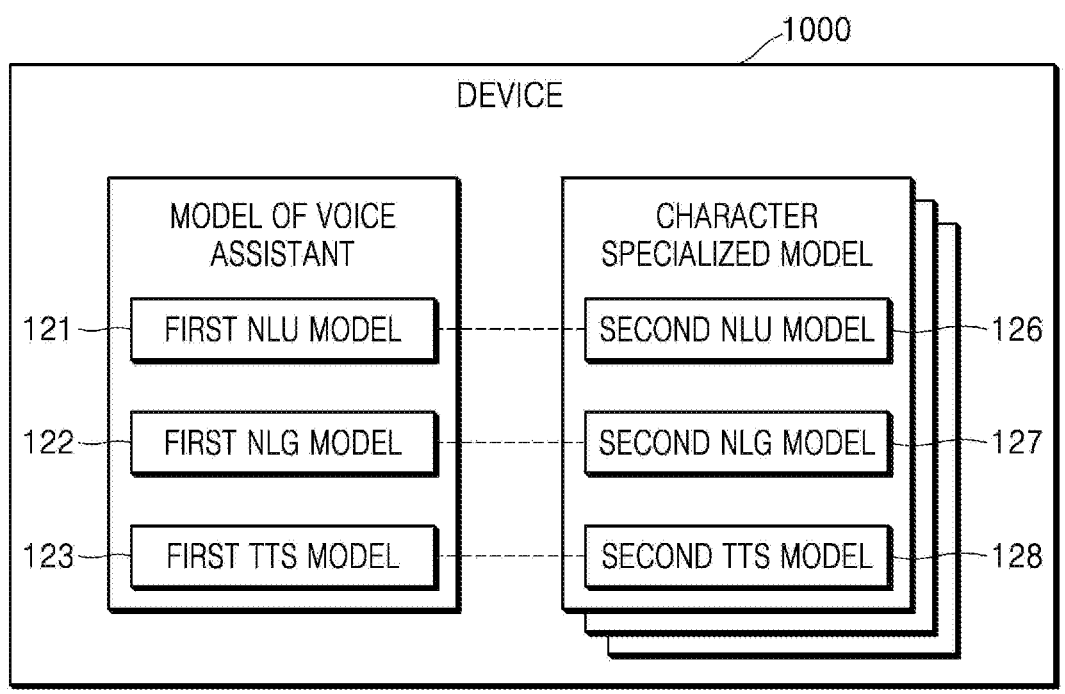
FIG. 12 is a diagram illustrating an example in which a device uses a character specialized model and a model of a voice assistant together according to an embodiment.

FIG. 12 is a diagram illustrating an example in which the device 1000 uses a character specialized model and a model of a voice assistant together according to an embodiment.

Referring to FIG. 12, the device 1000 may interoperate with the model of the voice assistant and the character specialized model to provide a voice assistant service specialized to the character.

For example, the device 1000 may interoperate a first NLU model 121 in the model of the voice assistant with a second NLU model 126 in the character specialized model. The first NLU model 121 and the second NLU model 126 may be training models for interpreting a voice input of a user.

For example, the voice input of the user may be recognized and recognized data may be input to the first NLU model 121, and thus data obtained by primarily interpreting the voice input of the user may be output from the first NLU model 121. In addition, the data output from the first NLU model 121 may be input to the second NLU model 126, and thus data obtained by secondarily analyzing the voice input of the user may be output from the second NLU model 126.

When a character is not selected, data obtained by interpreting the voice input of the user may be output from the first NLU model 121, and then when the character is selected, data obtained by interpreting the voice input of the user in consideration of the character may be output through the second NLU model 126.

Also, for example, the device 1000 may interoperate a first NLG model 122 in the training model of the voice assistant with a second NLG model 127 in the character specialized model. The first NLG model 122 and the second NLG model 127 may be training models for generating a response message to be provided to the user. The first NLG model 122 and the second NLG model 127 may determine a response operation of the device 1000. In particular, the data output from the first NLG model 122 may be input to the second NLG model 127 to generate and output a final response message. In addition, when the character is not selected, the response message may be generated and output through the first NLG model 122, and when the character is selected, the response message may be generated and output through the second NLG model 127.

Also, for example, the device 1000 may interoperate a first TTS model 123 in the model of the voice assistant with a second TTS model 128 in the character specialized model. The first TTS model 123 and the second TTS model 128 may be training models for determining a voice characteristic of sound of the response message when the sound of the response message is output. In particular, when the character is not selected, the sound of the response message may be output using the first TTS model 123, and when the character is selected, the sound of the response message may be output through the second TTS model 128. In this case, the first TTS model 123 may receive the response message output from the first NLG model 122 and output the response message as sound corresponding to the first TTS model 123. In addition, the second TTS model 128 may receive the response message output from the second NLG model 127 and output the response message as sound corresponding to the second TTS model 128.

FIG. 12 illustrates an embodiment in which the model of the voice assistant and the character specialized model operate in connection with each other, but the first NLU model 121, the first NLG model 122, and the first TTS model 123 among the models of the voice assistant may be changed to the second NLU model 126, the second NLG model 127, and the second TTS model 128 of the character specialized model respectively and operate in connection with the remaining models of the voice assistant. In this case, the second NLU model 126, the second NLG model 127, and the second TTS model 128 of the character specialized model may be models generated as a result of retraining the first NLU model 121, the first NLG model 122, and the second TTS model 123 by using training data on the character. In addition, the second NLU model 126, the second NLG model 127, and the second TTS model 128 of the character specialized model may be models generated independently and separately from the first NLU model 121, the first NLG model 122, and the second TTS model 123 respectively.

Meanwhile, the model of the voice assistant of FIG. 12 may further include at least one of a first ASR model and a first DM model, and the character specialized model may further include at least one of a second ASR model and a second DM model. In this case, the voice input of the user may be recognized by at least one of the first ASR model or the second ASR model. In addition, a type of the response message to the voice input of the user may be determined by at least one of the first DM model or the second DM model.

Figure 13:
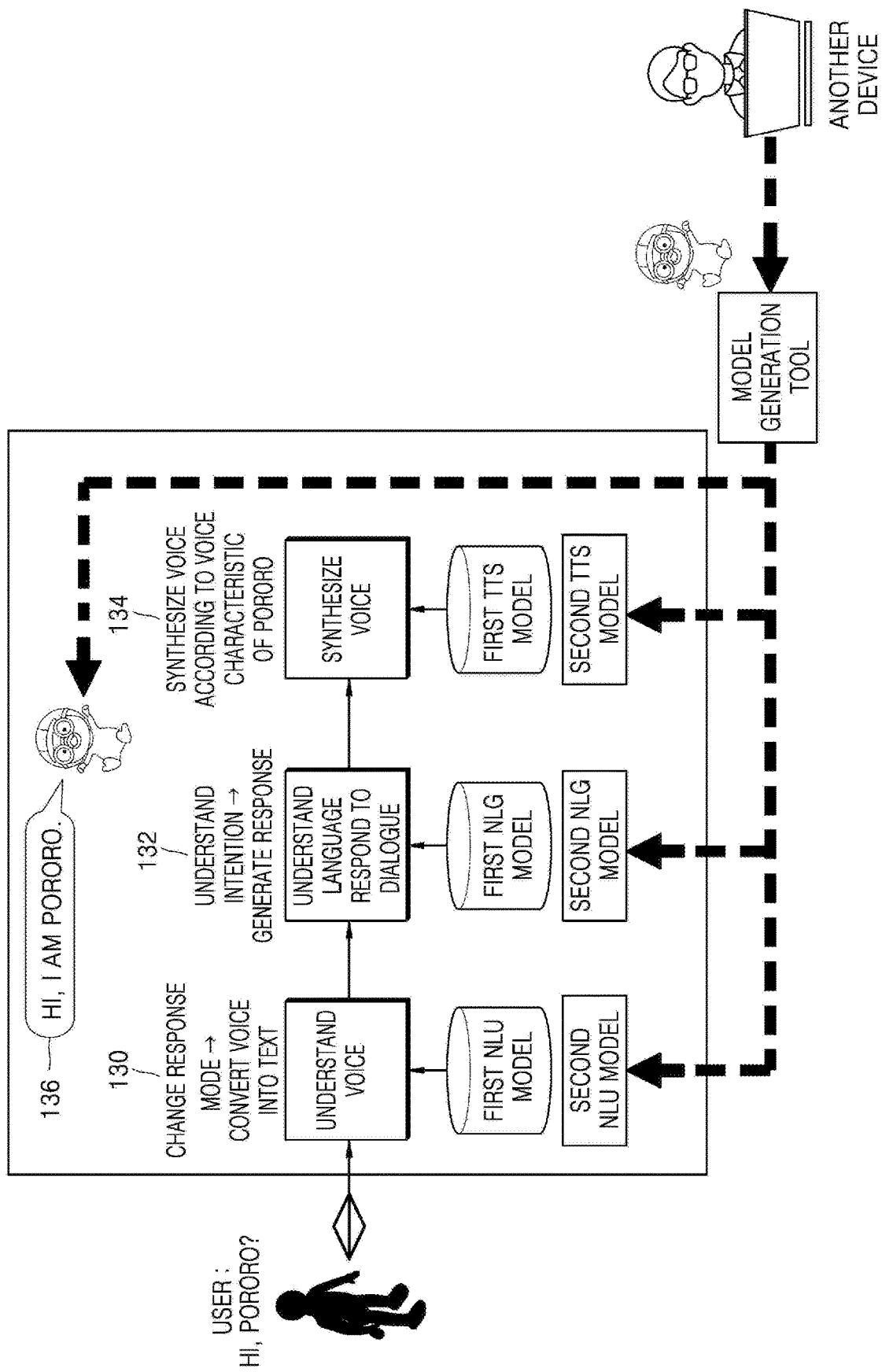
FIG. 13 is a diagram illustrating an example in which a device provides a voice assistant service using a character specialized model according to an embodiment.

FIG. 13 is a diagram illustrating an example in which the device 1000 provides a voice assistant service using a character specialized model according to an embodiment.

Referring to FIG. 13, when a user of the device 1000 inputs a voice "Hi, Pororo" in operation 130, the device 1000 may convert the voice of the user into text according to a voice input of the user and change a response mode of a voice assistant to a Pororo mode. For example, the device 1000 may recognize the voice input of the user using an ASR model of the voice assistant and identify whether the recognized voice input of the user includes a call name for changing the response mode to the Pororo mode. In this case, when the recognized voice input of the user includes the call name for changing the response mode to the Pororo mode, the device 1000 may change the response mode of the voice assistant to the Pororo mode.

In addition, the device 1000 may interpret the voice input using both a first NLU model of the voice assistant and a second NLU model of the character specialized model. The device 1000 may input the voice input of the user to the first NLU model of the voice assistant and the second NLU model of the character specialized model, and obtain analysis data obtained by interpreting the voice input of the user as an output value. In this case, the device 1000 may input data obtained as described above with reference to FIG. 10 together to the first NLU model of the voice assistant and the second NLU model of the character specialized model.

Also, in operation 132, the device 1000 may generate a response message to the voice input. The device 1000 may generate the response message to the voice input using the first NLG model of the voice assistant and the second NLG model of the character specialized model together. The device 1000 may input the output value obtained in operation 130 to the first NLG model of the voice assistant and the second NLG model of the character specialized model, and obtain the response message to be provided to the user as the output value. In this case, the device 1000 may input the data obtained as described above with reference to FIG. 10 together to the first NLG model of the voice assistant and the second NLG model of the character specialized model. The response message may be generated by reflecting various information related to Pororo and tone of Pororo.

Meanwhile, the device 1000 may use a first DM model of the voice assistant and a second DM model of the character specialized model to generate the response message to the voice input. The device 1000 may determine the type of the response message using the first DM model of the voice assistant and the second DM model of the character specialized model before generating the response message using the first NLG model of the voice assistant and the second NLG model of the character specialized model. In this case, the device 1000 may input the output value obtained in operation 130 to the first DM model of the voice assistant and the second DM model of the character specialized model, and obtain data indicating the type of the response message to be provided to the user as the output value. In addition, the device 1000 may input the data indicating the type of the response message to the first NLG model of the voice assistant and the second NLG model of the character specialized model together with the output value obtained in operation 130.

In operation 134, the device 1000 may generate sound or audio of the response message. The device 1000 may generate the response message to the voice input using a first TTS model of the voice assistant and a second TTS model of the character specialized model together. The device 1000 may input the output value obtained in operation 132 to the first TTS model of the voice assistant and the second TTS model of the character specialized model, and determine a voice characteristic of the response message to be provided to the user. In this case, the device 1000 may input the data obtained as described above with reference to FIG. 10 together to the first NLG model of the voice assistant and the second NLG model of the character specialized model. In addition, the device 1000 may generate the sound of the voice message by reflecting the determined voice characteristic.

In operation 136, the device 1000 may display text of the response message on a message window of the voice assistant and change an icon indicating the voice assistant to a Pororo icon. Additionally or alternatively, the device 1000 may output sound of the voice message reflecting a voice characteristic of Pororo.

Figure 14:
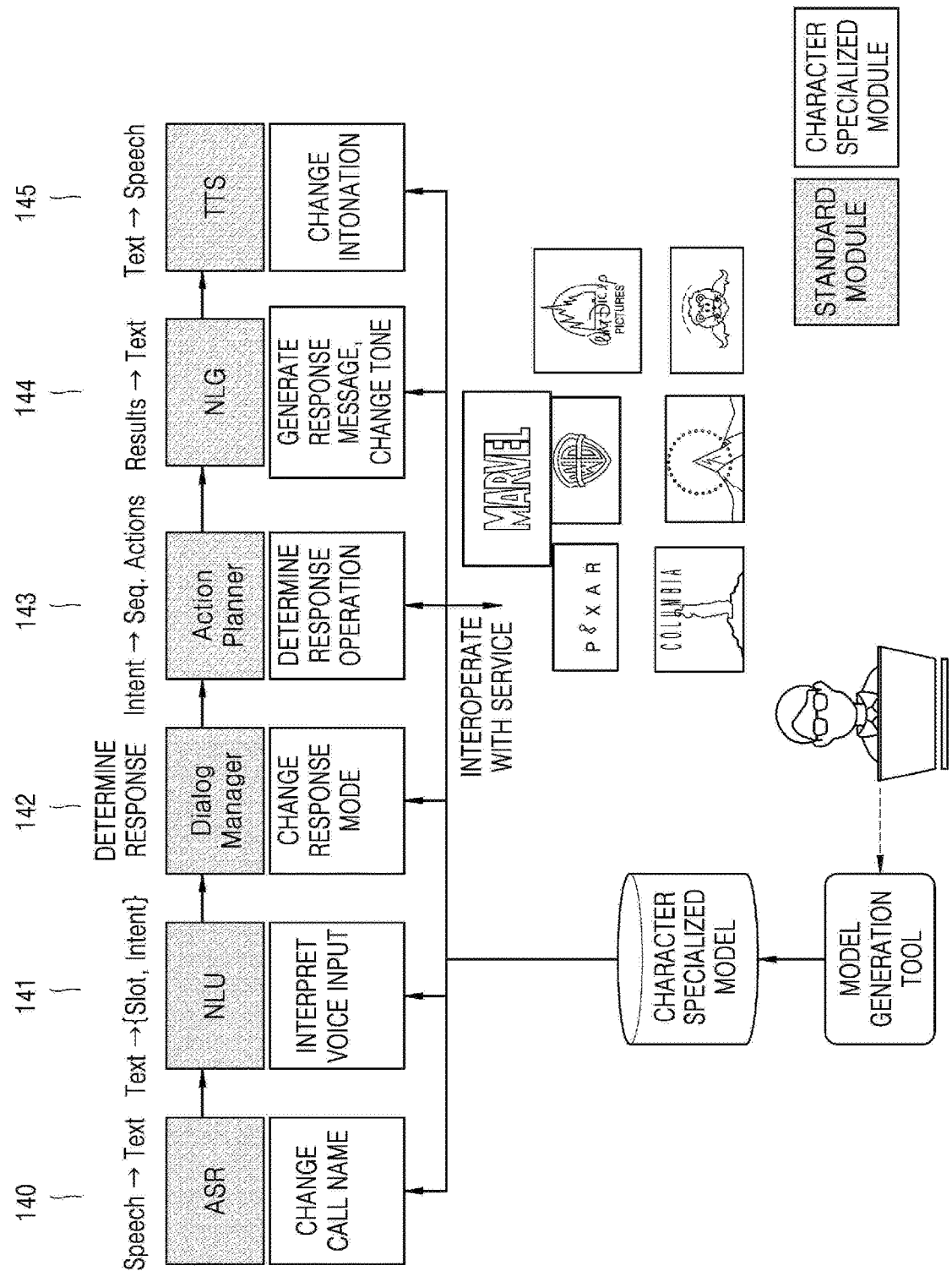
FIG. 14 is a diagram illustrating a detailed operation of a device for providing a voice assistant service according to an embodiment.

FIG. 14 is a diagram illustrating a detailed operation of the device 1000 for providing a voice assistant service according to an embodiment.

Referring to FIG. 14, in operation 140, a voice assistant of the device 1000 may recognize a voice of a user by converting the voice of the user into text, and may change a call name of the voice assistant by referring to a call name set in a character specialized model. The voice assistant may recognize a voice input of the user and generate text representing the recognized voice of the user, using an ASR model.

In operation 141, the voice assistant of the device 1000 may interpret the recognized voice of the user using the character specialized model. By using an NLU model of the device 1000, the voice assistant of the device 1000 may interpret the recognized voice of the user. The voice assistant may input the text representing the recognized voice of the user into the NLU model, and may obtain analysis data obtained by interpreting the recognized voice of the user as an output value. The output analysis data may include, for example, intent information and slot information related to the intent information. In this case, the voice assistant may input data obtained as described above with reference to FIG. 10 together to the NLU model.

In operation 142, the voice assistant of the device 1000 may determine a response to the user and change a response mode of the voice assistant by referring to the setting value in the character specialized model. The voice assistant may determine whether to respond to the user by using a DM model. When the response to the user is determined, the voice assistant may change the response mode to a character response mode. By changing the response mode, the voice assistant may provide a dialogue with the user according to a changed response style.

In operation 143, the voice assistant of the device 1000 may determine a response operation of the device 1000 using the character specialized model. In operation 144, the voice assistant of the device 1000 may generate a response message and change a tone of the response message, by using the character specialized model. The voice assistant of the device 1000 may interoperate with a service related to the character to determine the response operation and generate the response message.

The voice assistant may determine the response operation by using an action planner (AP) model. The AP model may be an AI model for determining an action for responding to the user. The voice assistant may determine the response operation by inputting data output from the NLU model to the AP model. In this case, the voice assistant may interoperate with a predetermined service to determine the response operation. The voice assistant may determine the response operation related to the service by inputting information about the service to the AP model along with the data output from the NLU model. The AP model may output a sequence of the response operation based on the intent information output from the NLU model. The information about the service may include, for example, information about a type of the service, a function provided by the service, information provided by the service, etc., but is not limited thereto.

The voice assistant may also generate the response message and change the tone of the response message, by using an NLG model. The response message may be data in text format. The NLG model may be an AI model trained based on a dialogue script related to a character, tone data of the character, content information related to the character, and QNA data related to the character.

Also, in operation 145, the voice assistant of the device 1000 may generate sound or audio of the response message. The voice assistant may generate the sound of the response message by reflecting an intonation of the character, by using the character specialized model. The voice assistant may change an intonation of the sound to be generated from the response message to the intonation of the character using a TTS model.

Figure 15:
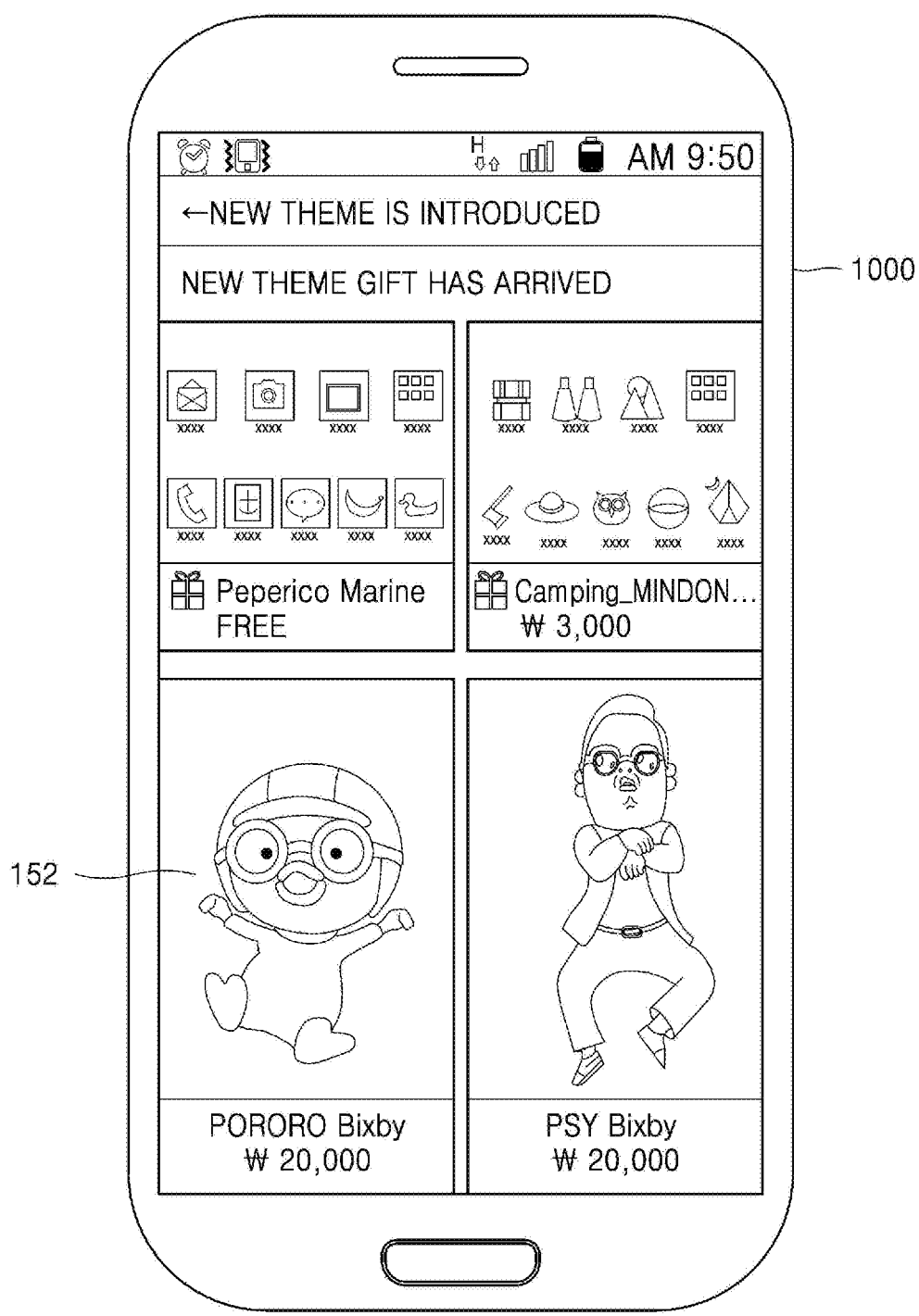
FIG. 15 is a diagram illustrating an example in which a device downloads a character specialized model from a server according to an embodiment.

FIG. 15 is a diagram illustrating an example in which the device 1000 downloads a character specialized model from a server according to an embodiment.

Referring to FIG. 15, the device 1000 may display a list of character specialized models. For example, the device 1000 may display the list of character specialized models in a GUI for downloading a theme of an OS of the device 1000. In addition, the device 1000 may select the character specialized model from the list of character specialized models, and download the selected character specialized model. For example, when the device 1000 selects "Pororo Bixby" 152, the device 1000 may download a character specialized model for Pororo. In this case, the device 1000 may download the character specialized model for Pororo together with an OS theme for Pororo.

Figure 16:
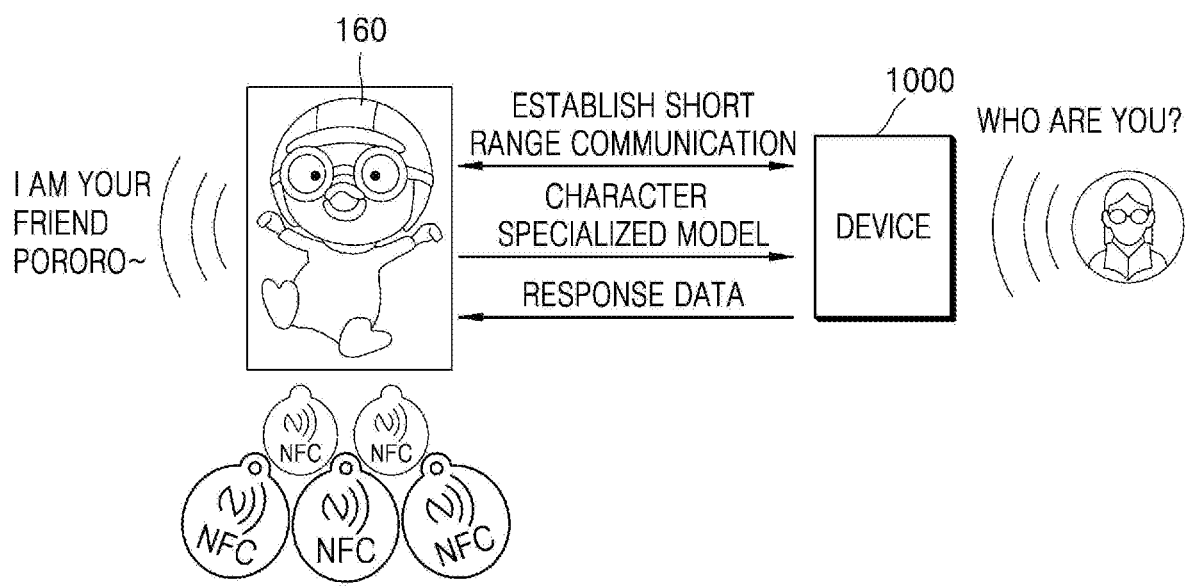
FIG. 16 is a diagram illustrating an example in which a device obtains a character specialized model by approaching a character product according to an embodiment.

FIG. 16 is a diagram illustrating an example in which the device 1000 obtains a character specialized model by approaching a character product according to an embodiment.

Referring to FIG. 16, when the device 1000 approaches a Pororo doll 160, the device 1000 may establish short range communication with the Pororo doll 160. The device 1000 may receive the character specialized model from the Pororo doll 160 through the short range communication. The character specialized model may be a character specialized model for Pororo.

In addition, when the user inputs a voice input of "Who are you" to the device 1000, the device 1000 may generate response data using the character specialized model, and transmit the generated response data to the Pororo doll 160. The Pororo doll 160 may receive the response data and output the response data through a speaker of the Pororo doll 160.

Figure 17:
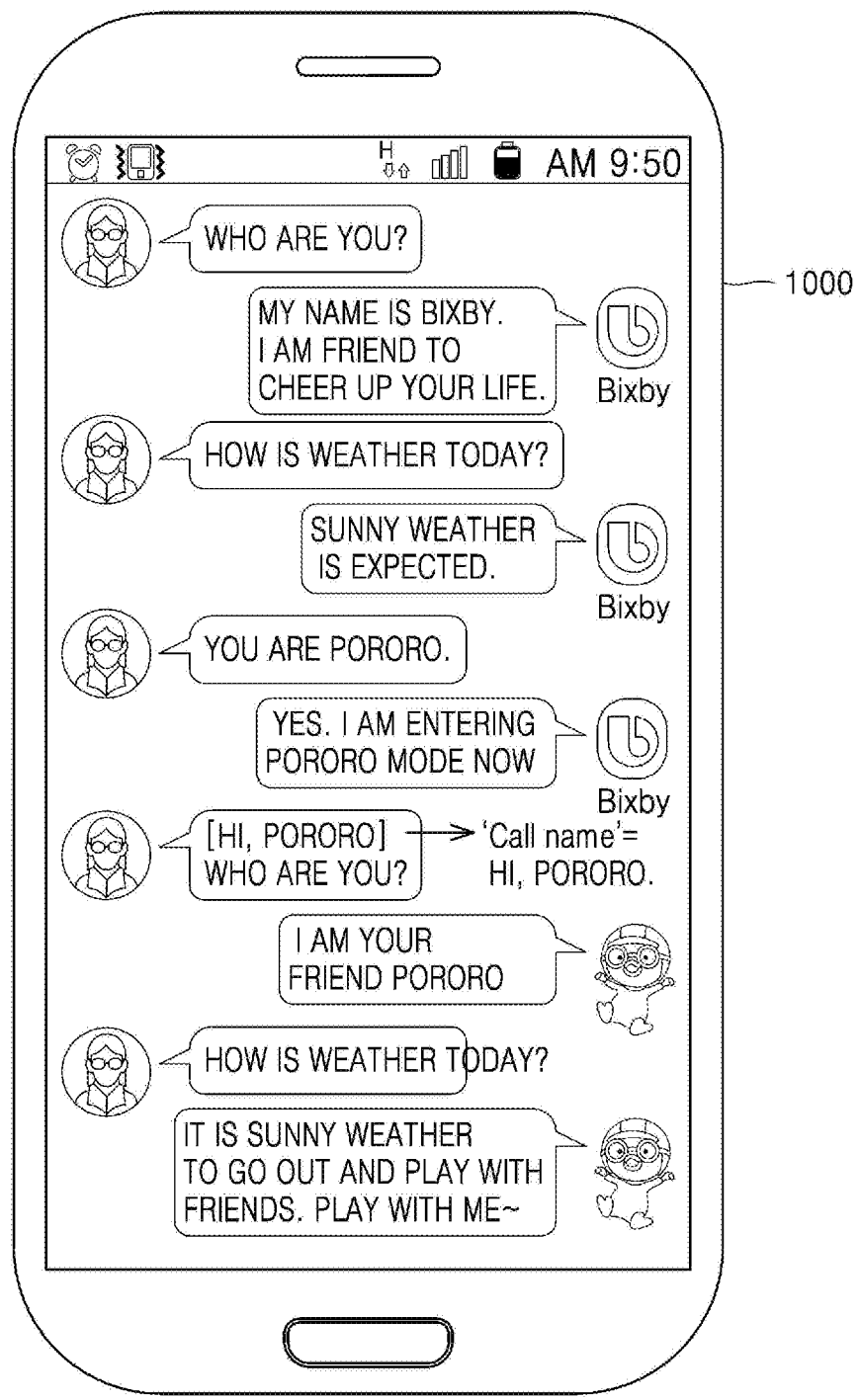
FIG. 17 is a diagram illustrating a chat window of a voice assistant service displayed on a device according to an embodiment.

FIG. 17 is a diagram illustrating a chat window of a voice assistant service displayed on the device 1000 according to an embodiment.

Referring to FIG. 17, while the voice assistant is chatting with a user and the user inputs (or provides) a voice input such as "You are Pororo" into the device 1000, the voice assistant may recognize at least part of a predetermined voice input (e.g., "Pororo") in the voice input of the user and change a response mode of the voice assistant to a particular character specialized mode, e.g., Pororo mode. Thereafter, the voice assistant may chat with the user using a character specialized model of Pororo.

FIG. 18 is a diagram illustrating an example of a response message according to a response mode, according to an embodiment.

Referring to FIG. 18, the device 1000 may use a character specialized model corresponding to the response mode according to a response mode of a voice assistant. In addition, the device 1000 may generate a response message of different content and a different tone according to the response mode of the voice assistant.

Figure 19:
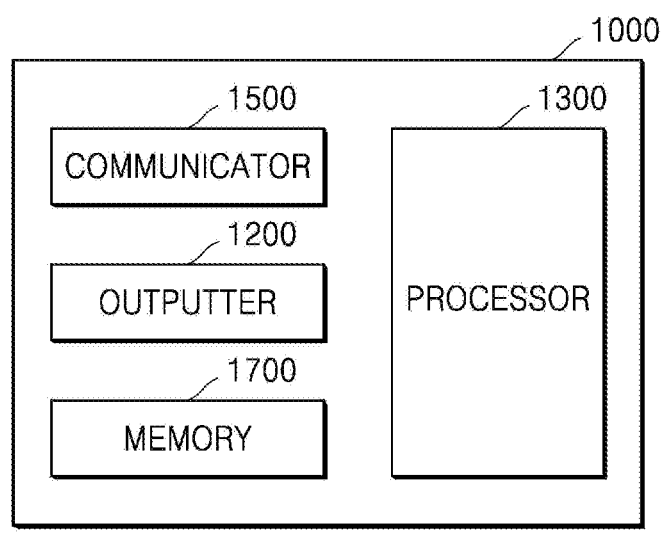
FIGS. 19 and 20 are block diagrams of a device according to one or more embodiments.
Figure 20:
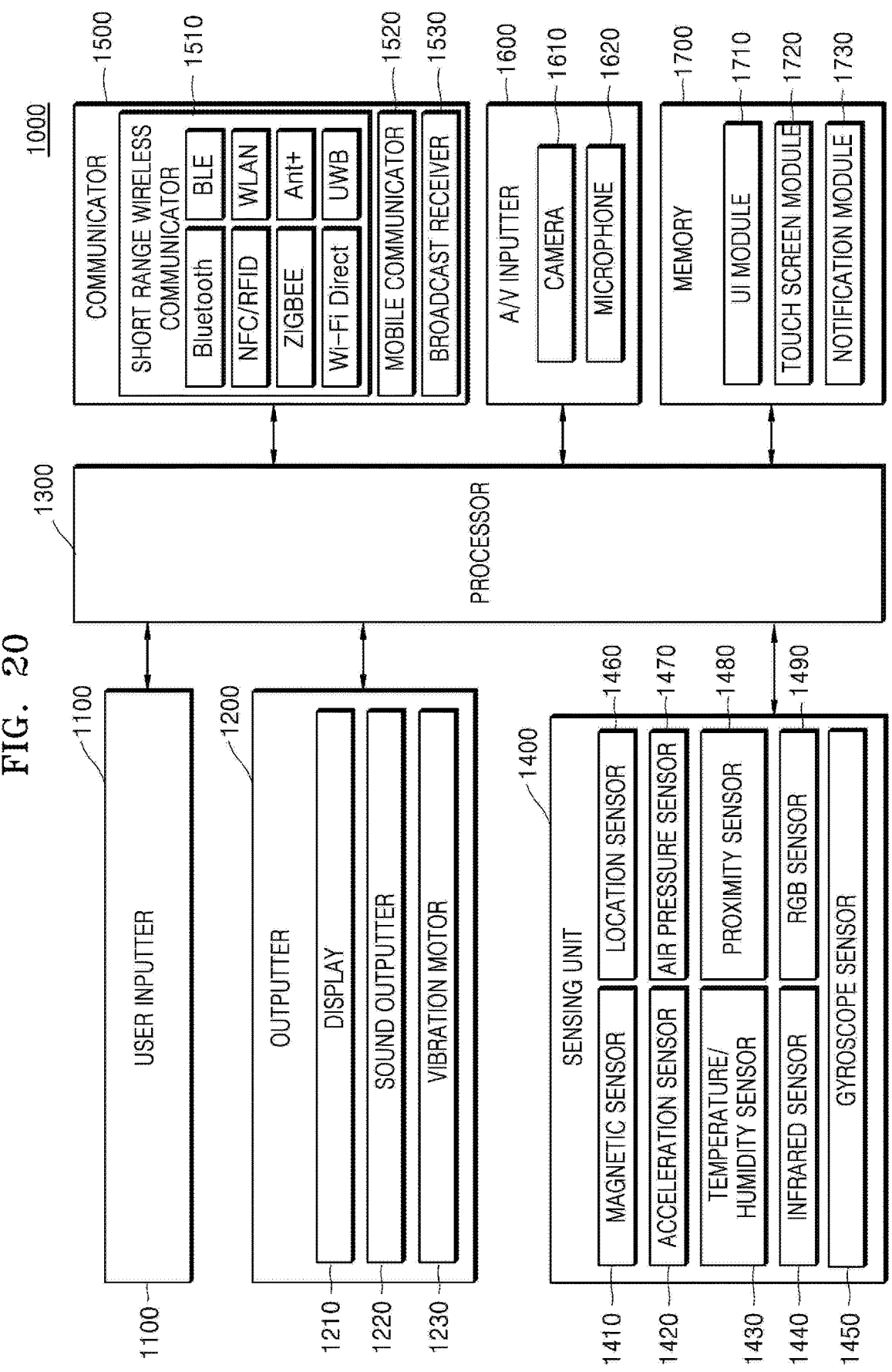

FIGS. 19 and 20 are block diagrams of the device 1000 according to one or more embodiments.

As shown in FIG. 19, the device 1000 according to an embodiment may include a communicator 1500, an outputter 1200, a memory 1700, and a processor 1300. However, it is understood that one or more other embodiments are not limited to the components illustrated in FIG. 19. For example, the device 1000 may be implemented by more components than the components shown in FIG. 19, or the device 1000 may be implemented by fewer components than the components shown in FIG. 19.

As shown in FIG. 20, the device 1000 may include a user inputter 1100, a sensing unit 1400 (e.g., one or more sensors), and an audio/video (A/V) inputter 1600, in addition to the communicator 1500, the outputter 1200, the memory 1700, and the processor 1300.

The user inputter 1100 is a mechanism for a user to input data for controlling the device 1000. For example, the user inputter 1100 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, a keyboard, a pointer device (such as a mouse), a track pad, a voice recognition device or unit, an audio input unit, a gesture input device, and the like, but the disclosure is not limited thereto.

The user inputter 1100 may receive a user input for a voice assistant service. The user inputter 1100 may receive a user input for executing the voice assistant service and for changing a response mode of the voice assistant service.

The outputter 1200 may output at least one of an audio signal, a video signal, or a vibration signal and may include a display 1210, a sound outputter 1220, and a vibration motor 1230.

The display 1210 may display and output information processed by the device 1000. For example, the display 1210 may display a graphical user interface (GUI) for the voice assistant service.

Meanwhile, if the display 1210 and a touch pad are configured as a touch screen in a layer structure, the display 1210 may be used as an input device in addition to an output device. According to an implementation form of the device 1000, the device 1000 may include two or more displays 1210.

The sound outputter 1220 may output audio data received from the communicator 1500 or stored in the memory 1700. Also, the sound outputter 1220 may output a sound signal related to functions (e.g., call signal reception sound, message reception sound, and alarm sound) performed by the device 1000. The sound outputter 1220 may include a speaker, a buzzer, etc. The sound outputter 1220 may output sound of a response message of the voice assistant service.

The vibration motor 1230 may output a vibration signal. For example, the vibration motor 1230 may output a vibration signal corresponding to an output of audio data and/or video data (e.g., call signal reception sound, message reception sound, etc.).

The processor 1300 may generally control the overall operation of the device 1000. For example, the processor 1300 may generally control the user inputter 1100, the outputter 1200, the sensing unit 1400, the communicator 1500, the A/V inputter 1600, etc., by executing programs stored in the memory 1700. The processor 1300 may control an operation of the device 1000 according to one or more embodiments by executing programs stored in the memory 1700.

Specifically, the processor 1300 may receive a character specialized model through the communicator 1500. For example, the processor 1300 may receive the character specialized model generated by the other device 3000 from the server 2000. In this case, the processor 1300 may display a list of character specialized models provided by the server 2000 and download the character specialized model from the server 2000 based on a selection input of the user.

In addition, the processor 1300 may receive the character specialized model generated by the other device 3000 from a predetermined product. For example, when the device 1000 approaches the product including a short range communication function and a data storage function, the device 1000 may establish short range communication with the product. The processor 1300 may then receive a character specialized model (or at least a portion of the character specialized model) stored in the product from the product through the short range communication. In addition or alternatively, link information for downloading the character specialized model (or at least a portion of the character specialized model) may be stored in the product, and the device 1000 may receive the link information stored in the product from the product and download the character information model using the received link information. According to an embodiment, the device 1000 may receive a portion of the character specialized model stored in the product, and may download another portion of the character specialized model via link information received from the product.

The processor 1300 may access the character specialized model through a voice assistant program. The processor 1300 may execute the voice assistant program installed in the device 1000 and access the character specialized model through the executed voice assistant program. At this time, the voice assistant program may be implemented as an application running on an OS, and may be implemented as a software module constituting middleware.

The processor 1300 may select one of a plurality of character specialized models installed in the device 1000 based on a user input, and access the selected character specialized model. The user input for selecting one of the plurality of character specialized models may be a voice input of the user including information referring to a character, or may be any other type of input (e.g., gesture input, touch input, pointer input, etc.).

A voice assistant program operating in the processor 1300 or an application operating in connection with the voice assistant program may receive a voice input of the user for selecting a character specialized model through the user inputter 1100, and provide a GUI through the outputter 1200 to receive the user input for selecting the character specialized model through the GUI.

The processor 1300 may receive the voice input of the user. The processor 1300 may receive the voice input of the user to provide a voice assistant service and generate a response message to the voice input of the user using the character specialized model and a model of a voice assistant. The voice assistant program operating in the processor 1300 may interpret the voice input of the user and generate the response message to the voice input of the user by using the character specialized model and the model of the voice assistant.

The processor 1300 may apply the voice input of the user or text converted from the voice input of the user to the character specialized model and the model of the voice assistant program to obtain a response message output from the character specialized model and the model of the voice assistant program, through the voice assistant program operating in the processor 1300. In this case, the response message to the voice input of the user may reflect, for example, at least one of a characteristic of the character, a characteristic of the user who prefers the character, content information related to the character, etc. In addition, the response message to the voice input of the user may include an expression according to a tone of the character. In this case, when the response message is output as sound, the response message may include information about the tone such that the response message may be output according to the tone of the character.

The processor 1300 may analyze the voice input of the user to select one of the character specialized models, and determine content of a service to be provided through the voice assistant program. The content of the service to be provided through the voice assistant program may be obtained by analyzing a user utterance through NLU. The processor 1300 may specify content of the service by obtaining intent and slot information related to the intent in the user utterance.

The processor 1300 may use data obtained from an application corresponding to the content of the service to generate the response message. The processor 1300 may change the data obtained from the application into data in the form that the voice assistant program may process and then generate the response message using the changed data. The generation of the response message may be performed by DM and NLG. In this case, when DM determines a type of the response message, NLG may generate the response message in the form suitable for the type of the response message. In addition, the processor 1300 may determine the response operation using an AP model before generating the response message.

The processor 1300 may output the generated response message through the outputter 1200. The voice assistant program or the application operating in connection with the voice assistant program may display the text of the response message on a screen of the device 1000. Additionally or alternatively, the processor 1300 may output sound of the response message through a speaker of the device 1000.

Meanwhile, the processor 1300 may receive a voice input of a user for changing the response mode of the voice assistant, through the voice assistant program or the application operating in connection with the voice assistant program. The processor 1300 may install a character specialized model and set a call name for calling or executing the installed character specialized model, through the voice assistant program. In addition, the processor 1300 may receive a voice input of the user for calling the set call name, through the voice assistant program or the application operating in connection with the voice assistant program. The processor 1300 may select a character specialized model to be used for the voice assistant based on the voice input of the user. The processor 1300 may change the response mode of the voice assistant to a character response mode according to the selected character specialized model. For example, when the character specialized model for Pororo is selected according to the voice input of the user for calling Pororo, the device 1000 may change the response mode of the voice assistant to a Pororo response mode.

The sensing unit 1400 may sense a state of the device 1000 or a state around the device 1000 and may transmit sensed information to the processor 1300.

The sensing unit 1400 may include at least one of a magnetic sensor 1410, an acceleration sensor 1420, a temperature/humidity sensor 1430, an infrared sensor 1440, a gyroscope sensor 1450, a location sensor (e.g. a GPS) 1460, an air pressure sensor 1470, a proximity sensor 1480, or an RGB sensor (an illuminance sensor) 1490, but the disclosure is not limited thereto. Functions of respective sensors may be intuitively inferred from their titles and understood by a normally skilled artisan.

The communicator 1500 may include one or more components for communicating with the server 2000 and the other device 3000. For example, the communicator 1500 may include a short range wireless communicator 1510, a mobile communicator 1520, and a broadcast receiver 1530.

The short-range wireless communicator 1510 may include at least one of a Bluetooth communicator, a Bluetooth low energy (BLE) communicator, a near field communicator, a WLA/V communicator, a WLA/V (WiFi) communicator, a Zigbee communicator, an infrared data association (IrDA) communicator, a Wi-Fi direct (WFD) communicator, an ultra wideband (UWB) communicator, an Ant+ communicator, a Z-wave communicator, etc., but the disclosure is not limited thereto.

The mobile communicator 1520 may transmit and receive a radio signal to and from at least one of a base station, an external terminal, or a server on a mobile communication network. Here, the radio signal may include various types of data according to a voice call signal, a video call signal, or a text/multimedia message transmission/reception.

The broadcast receiver 1530 may receive a broadcast signal and/or broadcast-related information from outside through a broadcast channel. The broadcast channel may include a satellite channel and a terrestrial channel. The device 1000 may not include the broadcast receiver 1530 according to an implementation example.

In addition, the communicator 1500 may transmit and receive information for providing the voice assistant service specialized for a character to and from the server 2000 and the other device 3000.

The A/V inputter 1600 is configured to receive or obtain an input of at least one of an audio signal or a video signal, and may include a camera 1610, a microphone 1620, and the like. The camera 1610 may obtain an image frame such as a still image or a moving image through an image sensor in a video communication mode or a photographing mode. An image captured through the image sensor may be processed through the processor 1300 or a separate image processor.

The microphone 1620 may receive an external sound signal and process the received signal as electrical voice data. For example, the microphone 1620 may receive a sound signal from an external device or a speaker. The microphone 1620 may use various noise reduction algorithms for eliminating noise generated in a process of receiving an external sound signal.

The memory 1700 may store a program for processing and controlling the processor 1300 (which may be one processor or a plurality of processors) and may store data input to or output from the device 1000.

The memory 1700 may include at least one type memory medium of a flash memory type, a hard disk type, a multimedia card micro type, a card type memory (e.g., secure digital (SD) memory, extreme digital (XD) memory, etc.), Random Access Memory (RAM), Static Random Access Memory (SRAM), Read Only Memory (ROM), Electrically Erasable Programmable Read-Only Memory (EEPROM), Programmable Read-Only Memory (PROM), a magnetic memory, a magnetic disk, an optical disk, etc.

The programs stored in the memory 1700 may be classified into a plurality of modules according to their functions, and may include, for example, a UI module 1710, a touch screen module 1720, a notification module 1730, and the like.

The UI module 1710 may provide a specialized UI, a GUI, and the like that interoperate with the device 1000 for each application. The touch screen module 1720 may sense a touch gesture of the user on the touch screen and may transmit information about the touch gesture to the processor 1300. The touch screen module 1720 according to an embodiment may recognize and analyze a touch code. The touch screen module 1720 may be configured as separate hardware including a controller.

Various sensors may be arranged inside or near the touch screen for sensing the touch on the touch screen or a close touch (e.g., hover or proximity input). In addition, a proximity sensor is an example of a sensor for sensing the touch on the touch screen. Touch gestures of the user may include a tap, a touch and hold, a double tap, a drag, a fanning, a flick, a drag and drop, a swipe, etc.

The notification module 1730 may generate a signal for notifying occurrence of an event of the device 1000.

Figure 21:
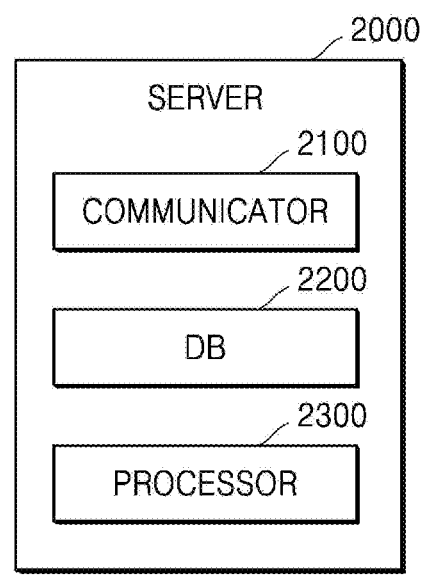
FIG. 21 is a block diagram of a server according to an embodiment.

FIG. 21 is a block diagram of the server 2000 according to an embodiment.

Referring to FIG. 21, the server 2000 according to an embodiment may include a communicator 2100, a database (DB) 2200, and a processor 2300 (e.g., one or more processors).

The communicator 2100 may include one or more components for communicating with the device 1000 and the other device 3000.

The DB 2200 may store a program for processing and controlling the processor 2300 and may store data input to and/or output from the server 2000.

The DB 2200 may include at least one type memory medium of a flash memory type, a hard disk type, a multimedia card micro type, a card type memory (e.g., SD memory, XD memory, etc.), RAM, SRAM, ROM, EEPROM, PROM, a magnetic memory, a magnetic disk, or an optical disk.

The programs stored in the DB 2200 may be classified into a plurality of modules according to their functions.

The processor 2300 may generally control an overall operation of the server 2000. For example, the processor 2300 may generally control the communicator 2100, the DB 2200, etc., by executing programs stored in the DB 2200. The processor 2300 may control an operation of the server 2000 according to one or more embodiments by executing programs stored in the DB 2200. The processor 2300 may manage generation and use of a character specialized model such that the character specialized model may be used in the voice assistant service.

Specifically, the processor 2300 may store a model generation tool for generating the character specialized model. The model generation tool may be a training model generation tool for generating the character specialized model, for example, an SDK, and may provide a plurality of functions for generating the character specialized model. The model generation tool may include, for example, a function for generating a training model for interpreting a voice input of the user, a function for generating a training model for generating a response message to the voice input of the user, and a function for generating a training model for determining a voice characteristic of the response message, but is not limited thereto.

The processor 2300 may provide the model generation tool for generating the character specialized model to the other device 3000 of, for example, a third party. A user of the other device 3000 may generate a model specialized for a character and provide a service regarding the character, and the other device 3000 may access the server 2000 and request the model generation tool from the server 2000.

The processor 2300 may receive the character specialized model generated by the other device 3000. The other device 3000 may generate the character specialized model using the model generation tool, and upload the generated character specialized model to the server 2000. The character specialized model may include, for example, a training model for interpreting a voice input of the user, a training model for generating a response message to the voice input of the user, and a training model for determining a voice characteristic of the response message, but is not limited thereto. For example, the training model for interpreting the voice input of the user may include an ASR model and an NLU model, the training model for generating the response message to the voice input of the user may include an AP model, a DM model, and an NLG model, and the training model for determining the voice characteristic of the response message may include a TTS model, but the disclosure is not limited thereto. The processor 2300 may store the received character specialized model in a DB for each third party.

The processor 2300 may provide the device 1000 with a list of character specialized models, and provide the device 1000 with a character specialized model selected by the device 1000 from the list of character specialized models.

Meanwhile, the other device 3000 may be implemented as a component of the device 1000 or a component of the server 2000, and a processor (e.g., one or more processors) in the other device 3000 may control an operation of the other device 3000 according to one or more embodiments.

Functions related to AI according to one or more embodiments operate through a processor and a memory. The processor may include one processor or a plurality of processors. At this time, the one processor or the plurality of processors may be a general purpose processor such as a central processing unit (CPU), an application processor (AP), a digital signal processor (DSP), a graphics dedicated processor such as a graphics processing unit (GPU), a vision processing unit (VPU), or an AI dedicated processor such as a natural processing unit (NPU). The one processor or the plurality of processors may control to process input data according to a predefined operating rule or AI model stored in the memory. Alternatively, when the one processor or the plurality of processors is the AI dedicated processor, the AI dedicated processor may be designed in a hardware structure specialized for processing a specific AI model.

The predefined operating rule or the AI model may be generated through training. Here, generating through training means that a basic AI model is trained using a plurality of training data by a learning algorithm such that the predefined operating rule or the AI model set to perform a wanted characteristic (or purpose) is generated. Such training may be performed in a device itself in which AI is performed according to one or more embodiments, or may be performed through a separate server and/or system. Examples of the learning algorithm may include supervised learning, unsupervised learning, semi-supervised learning, and reinforcement learning, but are not limited thereto.

The AI model may include a plurality of neural network layers. Each of the plurality of neural network layers may have a plurality of weight values, and perform a neural network operation through an operation result of a previous layer and an operation between the plurality of weights. The plurality of weights of the plurality of neural network layers may be optimized by a training result of the AI model. For example, the plurality of weights may be updated to reduce or minimize a loss value or a cost value obtained in the AI model during a training process. The AI network may include a deep neural network (DNN), for example, a convolutional neural network (CNN), a deep neural network (DNN), a recurrent neural network (RNN), a restricted boltzmann machine (RBM), a deep belief network (DBN), a bidirectional recurrent deep neural network (BRDNN), a deep Q-network, etc, but is not limited thereto.

The character specialized model may be generated by learning criteria for providing a voice assistant service specialized for a character. The character specialized model may be generated by learning criteria as to what data to use to provide a voice assistant service specialized for the character and how to provide the voice assistant service specialized for the character by using the data. For example, the character specialized model may be generated by learning criteria as to how to interpret a voice input of a user, how to generate a response message, and how to output the response message.

The character specialized model may output output data for providing the voice assistant service specialized for the character based on predetermined input data. The character specialized model may interpret the voice input of the user from the predetermined data, generate the response message, and determine an intonation of the response message. The character specialized model may provide the output data for providing the voice assistant service specialized for the character based on the predetermined data, by using the predetermined data according to a predetermined criterion as an input value. In addition, a result value output by the character specialized model may be used to update the character specialized model. The character specialized model may include, for example, a training model for interpreting a voice input of the user, a training model for generating a response message to the voice input of the user, and a training model for determining a voice characteristic of the response message, but is not limited thereto. For example, the training model for interpreting the voice input of the user may include an ASR model and an NLU model, the training model for generating the response message to the voice input of the user may include an AP model, a DM model, and an NLG model, and the training model for determining the voice characteristic of the response message may include a TTS model, but the disclosure is not limited thereto.

The device 1000 and the server 2000 may interoperate with each other to provide the voice assistant service specialized for the character.

The server 2000 may generate the character specialized model by learning a criterion for providing the voice assistant service specialized for the character, and the device 1000 may receive the character specialized model from the server 2000 and provide the voice assistant service specialized for the character. Alternatively, the server 2000 may receive input data to be applied to the character specialized model from the device 1000, and apply the received input data to the character specialized model to provide the device 1000 with output data output from the character specialized model.

Meanwhile, the device 1000, the server 2000, and the other device 3000 may interoperate together to provide the voice assistant service specialized for the character. In this case, the server 2000 may manage a general training model for the voice assistant service, and the other device 3000 may manage the character specialized model.

One or more embodiments of the disclosure may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium. Examples of the computer storage medium include all volatile and non-volatile media and separable and non-separable media, which are implemented by an arbitrary method or technology, for storing information such as computer-readable instructions, data structures, program modules, or other data.

Also, in this specification, the term "unit" or "module" may be a hardware component such as a processor or a circuit, and/or a software component executed by a hardware component such as a processor.

It will be understood by those of ordinary skill in the art that the foregoing description is for illustrative purposes only and that those of ordinary skill in the art may readily understand that various changes and modifications may be made without departing from the spirit or essential characteristics of the present inventive concept(s). It is therefore to be understood that the above-described embodiments are illustrative in all aspects and not restrictive. For example, each component described as a single entity may be distributed and implemented, and components described as being distributed may also be implemented in a combined form.

The scope of the disclosure is defined by the appended claims rather than the detailed description and all changes or modifications derived from the meaning and scope of the claims and their equivalents are to be construed as being included within the scope of the disclosure.

What is claimed is:

1. A method performed by a device for providing a voice assistant service through a voice assistant program, the method comprising:
   receiving, from an external device, a plurality of character specialized models for the voice assistant program;
   receiving a user voice input;
   determining whether the user voice input comprises a word indicating a character;
   determining a request for a response of the voice assistant program, based on analysis of the user voice input by using the voice assistant program;
   generating a response message regarding the response of the voice assistant program in text format, by using a first natural language generation (NLG) model included in the voice assistant program and a second NLG model included in the character specialized model together;
   determining whether a character specialized model is selected from the plurality of character specialized models, wherein the character specialized model is a model trained by using data related to a voice of the character;
   based on the character specialized model not being selected, generating sound of the response message using a first text to speech (TTS) model included in the voice assistant program;
   based on the character specialized model being selected, generating the sound of the response message reflecting voice characteristics of the character including at least one of a tone or an intonation of the character by using a second TTS model included in the character specialized model; and
   outputting the generated sound of the response message, wherein the second NLG model is a model trained by using data reflecting characteristics of a predetermined character for generating the response message, and
   wherein the second TTS model is a model trained by inputting a dialogue script about the predetermined character, tone data related to the predetermined character, intonation data of the predetermined character, content information related to the predetermined character, and question answering (QNA) data related to the predetermined character to an artificial intelligence (AI) model for generating the sound of the response message.

2. The method of claim 1, wherein the voice assistant program further comprises at least one of a first natural language understanding (NLU) model for a voice interpretation, or a first dialog management (DM) model for determining a type of the response message.

3. The method of claim 2, wherein the character specialized model further comprises at least one of a second NLU model for a voice interpretation, or a second DM model for determining a type of the response message.

4. The method of claim 2, wherein the character specialized model is trained by another device using a model generation tool provided to the another device, and is a training model trained using at least one of machine learning, a neural network, genes, deep learning, or a classification algorithm as an AI algorithm.

5. The method of claim 4, wherein the model generation tool provided to the other device is used by the other device to generate at least one of a second NLU model, the second NLG model, or the second TTS model.

6. The method of claim 3, wherein the generating the response message further comprises
   using the first NLU model and the second NLU model together.

7. The method of claim 1, further comprising:
   receiving, from the external device, a list of character specialized models;
   displaying the list of character specialized models; and
   receiving a selection of the plurality of character specialized models from the list of character specialized models,
   wherein the receiving the plurality of character specialized models comprises receiving the selected plurality of character specialized models from the server.

8. The method of claim 1, further comprising:
   establishing short range communication with a product; and
   obtaining, from the product via the short range communication, link information for downloading the plurality of character specialized models, wherein the receiving the plurality of character specialized models comprises downloading the plurality of character specialized models using the link information.

9. The method of claim 1, further comprising accessing the received character specialized model through the voice assistant program.

10. A device for providing a voice assistant service, the device comprising:
    a microphone configured to receive a user voice input;
    a communication interface;
    a memory storing one or more instructions; and
    at least one processor configured to execute the one or more instructions to:

receive, from an external device through the communication interface, a plurality of character specialized models to interoperate with a voice assistant program, receive, through the microphone, the user voice input, determine a request for a response of the voice assistant program, based on analysis of the user voice input by using the voice assistant program, generate a response message regarding the response of the voice assistant program in text format, by using a first natural language generation (NLG) model included in the voice assistant program and a second NLG model included in the character specialized model together, determine whether a character specialized model is selected from the plurality of character specialized models, wherein the character specialized model is a model trained by using data related to a voice of the character, based on the character specialized model not being selected, generate sound of the response message using a first text to speech (TTS) model included in the voice assistant program, based on the character specialized model being selected, generate the sound of the response message reflecting voice characteristics of the character including at least one of a tone or an intonation of the character by using a second TTS model included in the character specialized model, and output the sound of the generated response message, wherein the second NLG model is a model trained by using data reflecting characteristics of a predetermined character for generating the response message, and wherein the second TTS model is a model trained by inputting a dialogue script about the predetermined character, tone data related to the predetermined character, intonation data of the predetermined character, content information related to the predetermined character, and question answering (QNA) data related to the predetermined character to an artificial intelligence (AI) model for generating the sound of the response message.

11. The device of claim 10, wherein the voice assistant program further comprises at least one of a first natural language understanding (NLU) model for a voice interpretation, a first dialog management (DM) model for determining a type of the response message.

12. The device of claim 11, wherein the character specialized model further comprises at least one of a second NLU model for a voice interpretation, or a second DM model for determining a type of the response message.

13. The device of claim 11, wherein the character specialized model is trained by another device using a model generation tool provided to the other device, and is a training model trained using at least one of machine learning, a neural network, genes, deep learning, or a classification algorithm as an AI algorithm.

14. The device of claim 13, wherein the model generation tool provided to the other device is used by the other device to generate at least one of the second NLU model, the second NLG model, or the second TTS model.

15. The device of claim 12, wherein the at least one processor is further configured to, by executing the one or more instructions, perform using the first NLU model and the second NLU model together.

16. The device of claim 10, wherein the at least one processor is further configured to, by executing the one or more instructions, receive, from the external device through the communication interface, a list of character specialized models, control to display the list of character specialized models, receive a selection of the plurality of character specialized models from the list of character specialized models, and receive, from the external device through the communication interface, the selected plurality of character specialized models.

17. The device of claim 10, wherein the at least one processor is further configured to, by executing the one or more instructions, establish short range communication with a product, obtain, from the product via the short range communication, link information for downloading the plurality of character specialized models, and download the plurality of character specialized models using the link information.

18. A server for providing a voice assistant service, the server comprising:

a communication interface;

a memory storing one or more instructions; and at least one processor configured to execute the one or more instructions to:

obtain a plurality of character specialized models to interoperate with a voice assistant program of a device, obtain, through the communication interface, a user voice input of the device, determine whether the user voice input comprises a word indicating a character, determine a request for a response of the voice assistance program, based on analysis of the user voice input, generate a response message regarding the response of the voice assistant program in text format by using a first natural language generation (NLG) model included in the voice assistant program and a second NLG model included in the character specialized model together, and provide the generated response message to the device, determine whether a character specialized model is selected from the plurality of character specialized models, based on the character specialized model not being selected, generate sound of the response message using a first text to speech (TTS) model included in the voice assistant program, and based on the character specialized model being selected, generate the sound of the response message reflecting voice characteristics of the character including at least one of a tone or an intonation of the character by using a second TTS model included in the character specialized model, wherein the character specialized model is a model trained by using data related to a voice of the character, and wherein the second NLG model is a model trained by using data reflecting characteristics of a predetermined character for generating the response message, and wherein the second TTS model is a model trained by inputting a dialogue script about the predetermined character, tone data related to the predetermined character, intonation data of the predetermined character, content information related to the predetermined character, and question answering (QNA) data related to the predetermined character to an artificial intelligence (AI) model for generating the sound of the response message.

* * * * *